(12) United States Patent
Howell et al.

(10) Patent No.: US 10,526,975 B2
(45) Date of Patent: Jan. 7, 2020

(54) POWER EXTRACTION SYSTEM AND METHOD FOR A GAS TURBINE ENGINE OF A VEHICLE

(71) Applicant: The Boeing Company, Chicago, IL (US)

(72) Inventors: Eric A. Howell, Ballwin, MO (US); Jeffrey M. Roach, Saint Charles, MO (US); Thomas W. Omohundro, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 583 days.

(21) Appl. No.: 15/365,932

(22) Filed: Nov. 30, 2016

(65) Prior Publication Data

US 2018/0149091 A1    May 31, 2018

(51) Int. Cl.
| | |
|---|---|
| *F02C 7/32* | (2006.01) |
| *B64D 27/12* | (2006.01) |
| *F16H 37/06* | (2006.01) |
| *B64D 33/00* | (2006.01) |
| *F02C 7/36* | (2006.01) |
| *B64D 13/06* | (2006.01) |

(52) U.S. Cl.
CPC ............. *F02C 7/32* (2013.01); *B64D 27/12* (2013.01); *B64D 33/00* (2013.01); *F02C 7/36* (2013.01); *F16H 37/065* (2013.01); *B64D 2013/0618* (2013.01); *B64D 2221/00* (2013.01); *F05D 2220/323* (2013.01); *F05D 2260/40311* (2013.01); *Y02T 50/671* (2013.01)

(58) Field of Classification Search
CPC ... F02C 7/32; F02C 7/36; B64D 33/00; F16H 37/06; F16H 37/065; F05D 2260/40311
See application file for complete search history.

(56) References Cited

U.S. PATENT DOCUMENTS

| | | | |
|---|---|---|---|
| 7,468,561 B2 | 12/2008 | Kern et al. | |
| 7,605,483 B2 | 10/2009 | Kern et al. | |
| 7,882,691 B2 | 2/2011 | Lemmers, Jr. et al. | |
| 8,764,604 B2 | 7/2014 | McCune et al. | |
| 2006/0034693 A1* | 2/2006 | Lardellier | F02C 7/32 416/170 R |
| 2006/0272313 A1* | 12/2006 | Eick | F02C 3/107 60/39.63 |
| 2007/0137219 A1 | 6/2007 | Linet et al. | |

(Continued)

*Primary Examiner* — Steven M Sutherland

(57) ABSTRACT

A power extraction system and method for a gas turbine engine of a vehicle are provided. The system has an HP spool tower shaft coupled between an HP spool of the gas turbine engine and an accessory gearbox assembly coupled to the gas turbine engine. The HP spool tower shaft extracts mechanical power from the HP spool. The system has an LP spool tower shaft coupled between an LP spool of the gas turbine engine and the accessory gearbox assembly. The LP spool tower shaft extracts mechanical power from the LP spool. The system further has the accessory gearbox assembly having an accessory drive combining the mechanical power from both the HP spool and LP spool, having a planetary gear train coupled to the accessory drive, and having one or more engine-driven accessories coupled to the planetary gear train and driven by a planetary gear train output to generate power.

20 Claims, 12 Drawing Sheets

(56) References Cited

U.S. PATENT DOCUMENTS

| | | | |
|---|---|---|---|
| 2008/0200299 A1* | 8/2008 | Russ | F02C 7/32 |
| | | | 475/331 |
| 2010/0251726 A1 | 10/2010 | Jones et al. | |
| 2011/0101693 A1* | 5/2011 | Goi | F02C 7/275 |
| | | | 290/46 |
| 2012/0119020 A1* | 5/2012 | Burns | B64D 27/00 |
| | | | 244/58 |
| 2013/0062885 A1 | 3/2013 | Taneja | |
| 2013/0232941 A1 | 9/2013 | Huang | |

\* cited by examiner

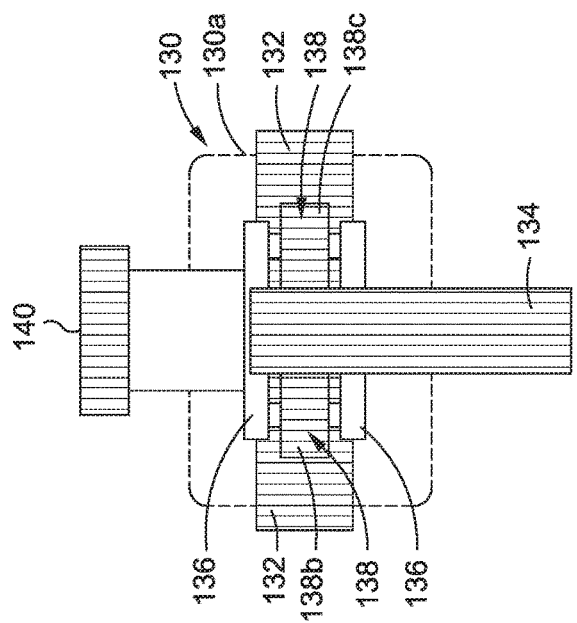
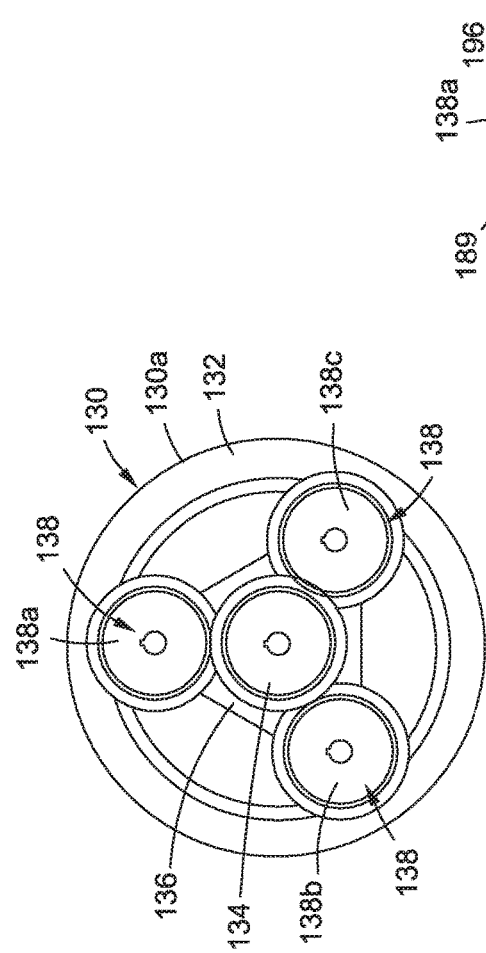
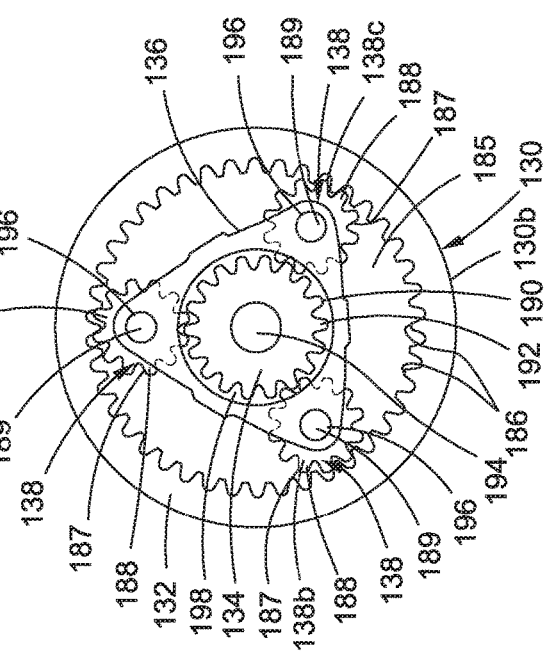
FIG. 7B
FIG. 7C
FIG. 7A

POWER EXTRACTION SYSTEM AND METHOD FOR A GAS TURBINE ENGINE OF A VEHICLE

GOVERNMENT STATEMENT

This invention was made with Government support under FA8650-11-2-2138, FA8650-08-D-3857 awarded by the Department of Defense. The Government has certain rights in this invention.

BACKGROUND

1) Field of the Disclosure

The disclosure relates generally to systems and methods for power extraction from gas turbine engines, and more particularly, to systems and methods for mechanical power extraction from both the high pressure (HP) spool and low pressure (LP) spool of multi-spool gas turbine engines of vehicles, such as aircraft, rotorcraft, and other vehicles.

2) Description of Related Art

Gas turbine engines in vehicles, such as air vehicles, including aircraft and rotorcraft, as well as in vehicles, such as watercraft, automobiles, and other types of vehicles, may be in the form of multiple spool (i.e., "multi-spool") gas turbine engines having a high pressure (HP) spool and a low pressure (LP) spool, where "spool" means a rotating assembly having a rotating shaft or rotor. The HP spool typically includes a high pressure (HP) shaft that drivingly connects a high pressure (HP) turbine to a high pressure (HP) compressor, and the LP spool typically includes a low pressure (LP) shaft that drivingly connects a low pressure (LP) turbine to a low pressure (LP) compressor and a fan. The LP shaft and the HP shaft may be concentrically aligned along a centerline of the gas turbine engine and may rotate relative to one another. In air vehicles, gas turbine engines are used for propulsive thrust of the air vehicle, and typically also supply mechanical power to engine-drive accessories or auxiliary components, such as generators, engine starter-generators, hydraulic pumps, fuel pumps, and other accessories, as well as to other systems of the air vehicle.

Mechanical power is typically extracted from the HP spool of the gas turbine engine, in order to drive one or more generators, such as one or more engine starter-generators (ESGs), to supply electrical power to vehicle systems for the vehicle, such as the aircraft or rotorcraft. Such an arrangement is common, for example, due to the need to drive the HP spool with the one or more ESGs, in order for the vehicle system to operate during an engine start mode. However, HP spool power extraction capability may be limited by a narrow surge margin of the HP compressor of the HP spool, and the air vehicle, such as the aircraft or rotorcraft, may require electrical power beyond that which the HP spool is capable of providing. The LP spool of the gas turbine engine is less prone to compressor stall and may thus support greater power extraction levels than the HP spool. Yet, it is still necessary for the one or more ESGs to connect to the HP spool during the engine start mode.

Known power extraction systems and methods for gas turbine engines exist. One known system includes use of a device for the extraction or off-take of mechanical power between the HP shaft and the LP shaft of a double-shaft gas turbine engine, where one engine starter-generator (ESGs) is coupled to the HP shaft of the HP spool, and a separate generator is coupled to the LP shaft of the LP spool. However, the separate generator coupled to the LP shaft of the LP spool is only available for power extraction and is not capable of providing an engine start function. Thus, in order to provide a dual-redundancy per engine for the engine start function, two ESGs are required to be coupled to the HP shaft of the HP spool, and one generator is required to be coupled to the LP shaft of the LP spool, which results in a total of three generators (i.e., two ESGs for the HP shaft and one generator for the LP shaft) per engine. This may result in increased weight of the power extraction system due to the presence of three generators, and may result in less efficiency of the power extraction system due to the LP spool (LP shaft) not being used for the engine start function, i.e., used during the engine start mode. Increased weight to vehicles, such as aircraft and rotorcraft, may, in turn, result in increased fuel costs. Moreover, such known system uses a two-speed transmission to extract power from both the LP shaft and the HP shaft, and this requires active control of the two-speed transmission. Unlike passive systems, active control systems may be more complicated, more expensive to implement and develop, and less reliable.

Another known power extraction system includes use of an epicyclic gear train, also known as a planetary gear train, coupled to an LP (low power or low pressure) shaft of an LP spool in a gas turbine engine that has the LP spool and an HP spool. The epicyclic gear train is configured to receive a rotational input from the LP shaft for increasing the rotational speed of the LP shaft to be more comparable to an HP shaft speed. However, with such known power extraction system, the epicyclic gear train is not attached to the HP shaft of the HP spool, and such system does not combine power extraction from both the LP spool and the HP spool. Moreover, such known power extraction system has an engine starter-generator only on the HP shaft, and it is the only unit or generator that may be used to start the gas turbine engine.

Accordingly, there is a need in the art for improved power extraction systems and methods for gas turbine engines of vehicles that combine power extraction from both the LP spool and the HP spool, that are more efficient and more lightweight, that still maintain a dual-redundancy for the engine start function, and that provide advantages over known systems and methods.

SUMMARY

Example implementations of this disclosure provide for improved power extraction systems and methods for gas turbine engines of vehicles. As discussed in the below detailed description, embodiments of the improved power extraction systems and methods for gas turbine engines of vehicles may provide significant advantages over known systems and methods.

In one embodiment there is provided a power extraction system for a gas turbine engine of a vehicle. The power extraction system comprises a high pressure (HP) spool tower shaft mechanically coupled between a high pressure (HP) spool of the gas turbine engine of the vehicle and an accessory gearbox assembly coupled to the gas turbine engine. The HP spool tower shaft extracts mechanical power from the HP spool.

The power extraction system further comprises a low pressure (LP) spool tower shaft mechanically coupled between a low pressure (LP) spool of the gas turbine engine of the vehicle and the accessory gearbox assembly. The LP spool tower shaft extracts mechanical power from the LP spool.

The power extraction system further comprises the accessory gearbox assembly. The accessory gearbox assembly comprises an accessory drive coupled to the HP spool tower shaft and coupled to the LP spool tower shaft. The accessory drive extracts and mechanically combines the mechanical power from both the HP spool and the LP spool.

The accessory gearbox assembly further comprises a planetary gear train coupled to the accessory drive. The planetary gear train is driven by the mechanical power from both the HP spool and the LP spool.

The accessory gearbox assembly further comprises one or more engine-driven accessories coupled to the planetary gear train. The one or more engine-driven accessories are driven by a planetary gear train output to generate power for use by one or more vehicle systems of the vehicle.

In another embodiment there is provided an air vehicle. The air vehicle comprises a fuselage, at least one wing connected to the fuselage, and at least one multi-spool gas turbine engine coupled to the at least one wing. The at least one multi-spool gas turbine engine has a high pressure (HP) spool and a low pressure (LP) spool.

The air vehicle further comprises a combined HP/LP spool power extraction system coupled to the HP spool and to the LP spool of the at least one multi-spool gas turbine engine. The combined HP/LP spool power extraction system comprises a high pressure (HP) spool tower shaft mechanically coupled between the HP spool and an accessory gearbox assembly coupled to the at least one multi-spool gas turbine engine. The HP spool tower shaft extracts mechanical power from the HP spool.

The combined HP/LP spool power extraction system further comprises a low pressure (LP) spool tower shaft mechanically coupled between the LP spool and the accessory gearbox assembly. The LP spool tower shaft extracts mechanical power from the LP spool.

The combined HP/LP spool power extraction system further comprises the accessory gearbox assembly. The accessory gearbox assembly comprises an accessory drive coupled to the HP spool tower shaft and coupled to the LP spool tower shaft. The accessory drive extracts and mechanically combines the mechanical power from both the HP spool and the LP spool.

The accessory gearbox assembly further comprises a planetary gear train coupled to the accessory drive. The planetary gear train comprises a ring gear driven by mechanical power extracted from the LP spool, a carrier driven by mechanical power extracted from the HP spool, and a sun gear that generates a planetary gear train output.

The accessory gearbox assembly further comprises one or more engine-driven accessories coupled to the planetary gear train. The one or more engine-driven accessories are driven by the planetary gear train output to generate power for use by one or more vehicle systems of the air vehicle.

In another embodiment there is provided a method of extracting mechanical power from both a high pressure (HP) spool and a low pressure (LP) spool of a gas turbine engine of a vehicle, to drive one or more engine-driven accessories. The method comprises the step of coupling a combined HP/LP spool power extraction system to the HP spool and to the LP spool of the gas turbine engine of the vehicle.

The combined HP/LP spool power extraction system comprises an accessory gearbox assembly having an accessory drive, a planetary gear train coupled to the accessory drive, and one or more engine-driven accessories coupled to the planetary gear train. The combined HP/LP spool power extraction system further comprises a high pressure (HP) spool tower shaft mechanically coupled between the HP spool and the accessory gearbox assembly. The combined HP/LP spool power extraction system further comprises a low pressure (LP) spool tower shaft mechanically coupled between the LP spool and the accessory gearbox assembly.

The method further comprises the step of extracting mechanical power from both the HP spool and the LP spool, via the accessory drive, to drive the planetary gear train. The method further comprises the step of mechanically combining, via the planetary gear train, the mechanical power extracted from both the HP spool and the LP spool, to obtain a planetary gear train output.

The method further comprises the step of driving the one or more engine-driven accessories with the planetary gear train output. The method further comprises the step of generating power from the one or more engine-driven accessories and supplying the power to one or more vehicle systems of the vehicle.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary embodiments, but which are not necessarily drawn to scale, wherein:

FIG. 7A is a schematic diagram of a front view of an exemplary embodiment of a planetary gear train that may be used in embodiments of the power extraction system of the disclosure;

FIG. 7B is a schematic diagram of a top view of the planetary gear train of FIG. 7A;

FIG. 7C is a schematic diagram of a front view of another exemplary embodiment of a planetary gear train that may used in embodiments of the power extraction system of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
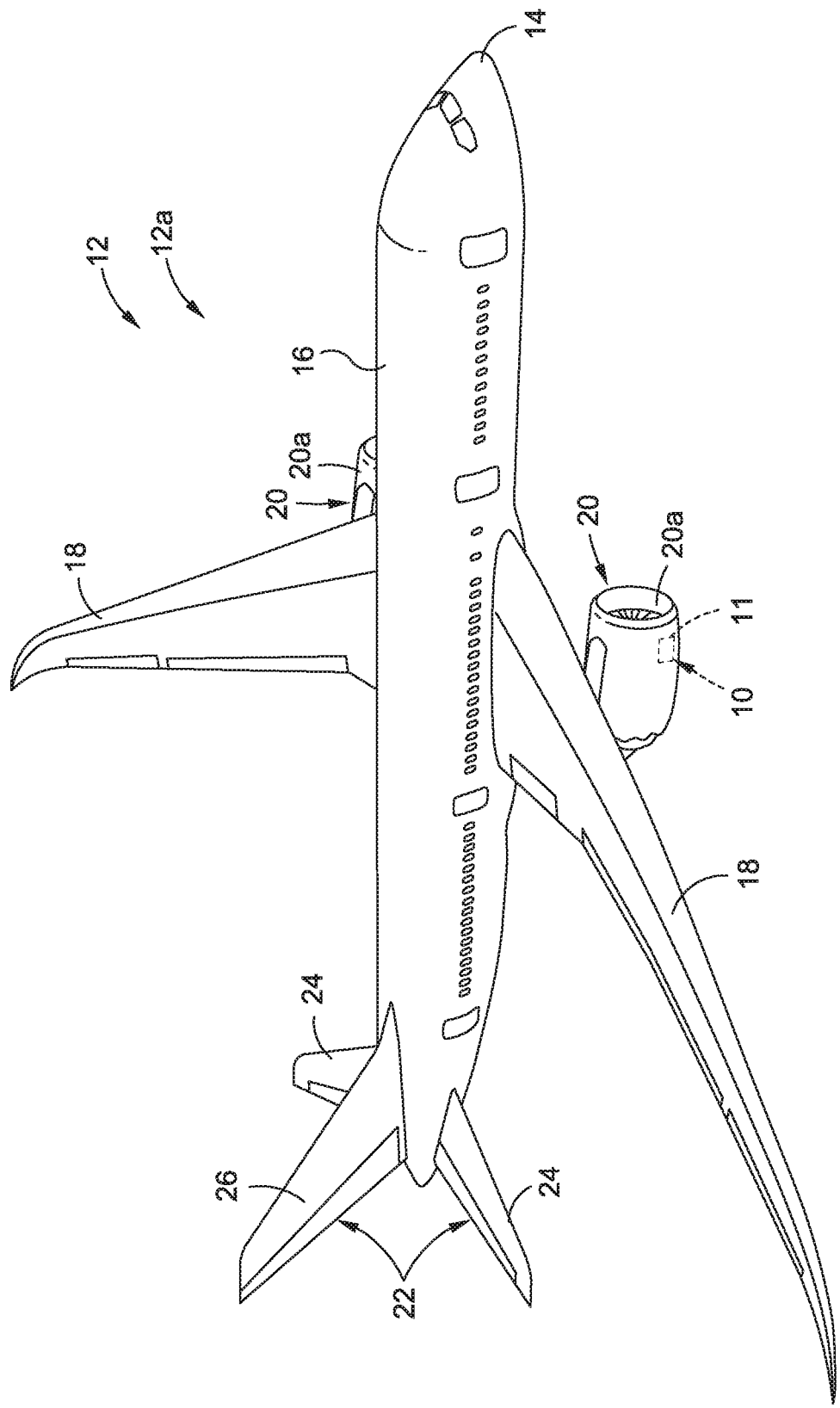
FIG. 1 is an illustration of a perspective view of a vehicle incorporating an exemplary embodiment of a power extraction system of the disclosure.

Now referring to the Figures, FIG. 1 is an illustration of a perspective view of a vehicle 12, such as in the form of an air vehicle 12a, incorporating an exemplary embodiment of a power extraction system 10, such as a combined HP/LP spool power extraction system 11, of the disclosure. As shown in FIG. 1, the vehicle 12, such as in the form of air vehicle 12a, comprises a nose 14, a fuselage 16, one or more wings 18, one or more gas turbine engines 20, such as in the form of one or more multi-spool gas turbine engines 20a and a tail 22 comprising horizontal stabilizers 24 and a vertical stabilizer 26. However, it is also contemplated that the power extraction system 10, such as the combined HP/LP spool power extraction system 11, disclosed herein, may be used in other vehicles 12 (see FIG. 4B) having gas turbine engines 20 (see FIG. 4B), such as rotorcraft 12b (see FIG. 4B), watercraft 12c (see FIG. 4B), automobiles 12d (see FIG. 4B), and other suitable vehicles 12 (see FIG. 4B).

Figure 2:
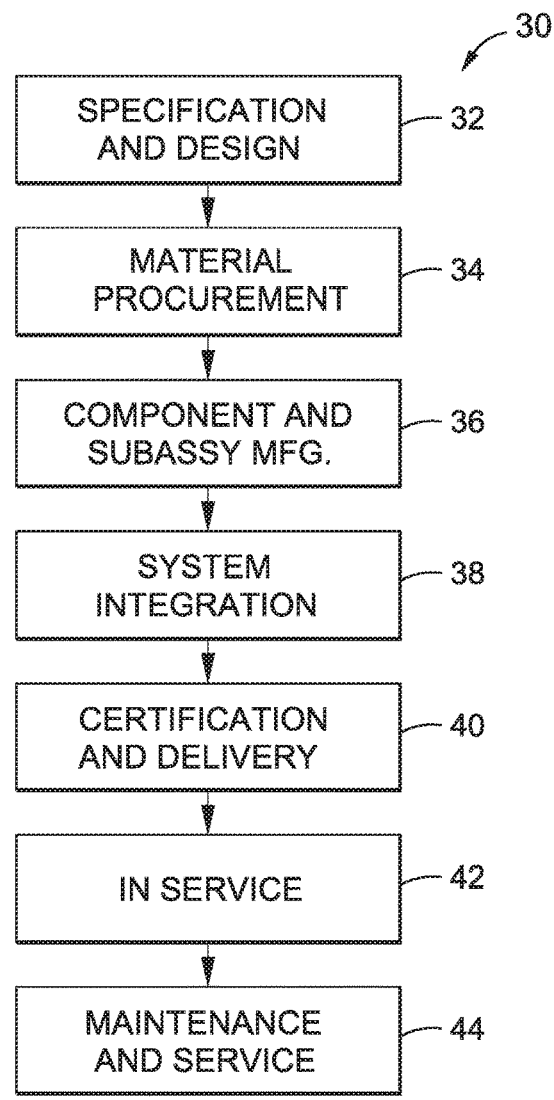
FIG. 2 is an illustration of a flow diagram of an embodiment of an aircraft manufacturing and service method.
Figure 3:
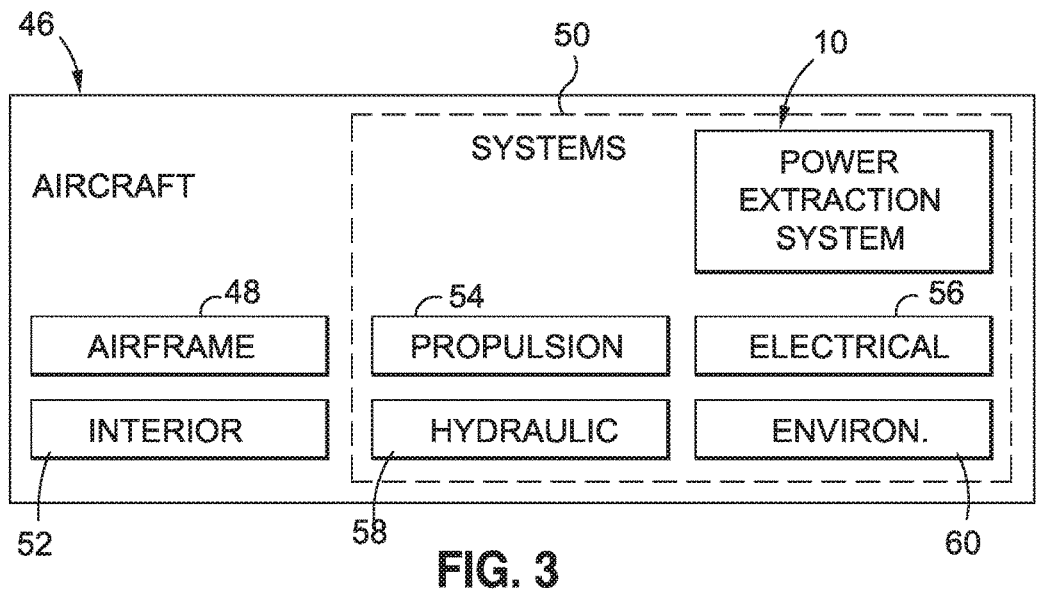
FIG. 3 is an illustration of a functional block diagram of an embodiment of an aircraft.

Now referring to FIGS. 2-3, FIG. 2 is an illustration of a flow diagram of an embodiment of an aircraft manufacturing and service method 30, and FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During pre-production, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 (see FIG. 2) may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. As further shown in FIG. 3, the systems 50 may include exemplary embodiments of the power extraction system 10 of the disclosure. Any number of other systems may be included. Although an aerospace example is shown, the principles of the disclosure may be applied to other industries, such as shipping or automotive industries.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4A:
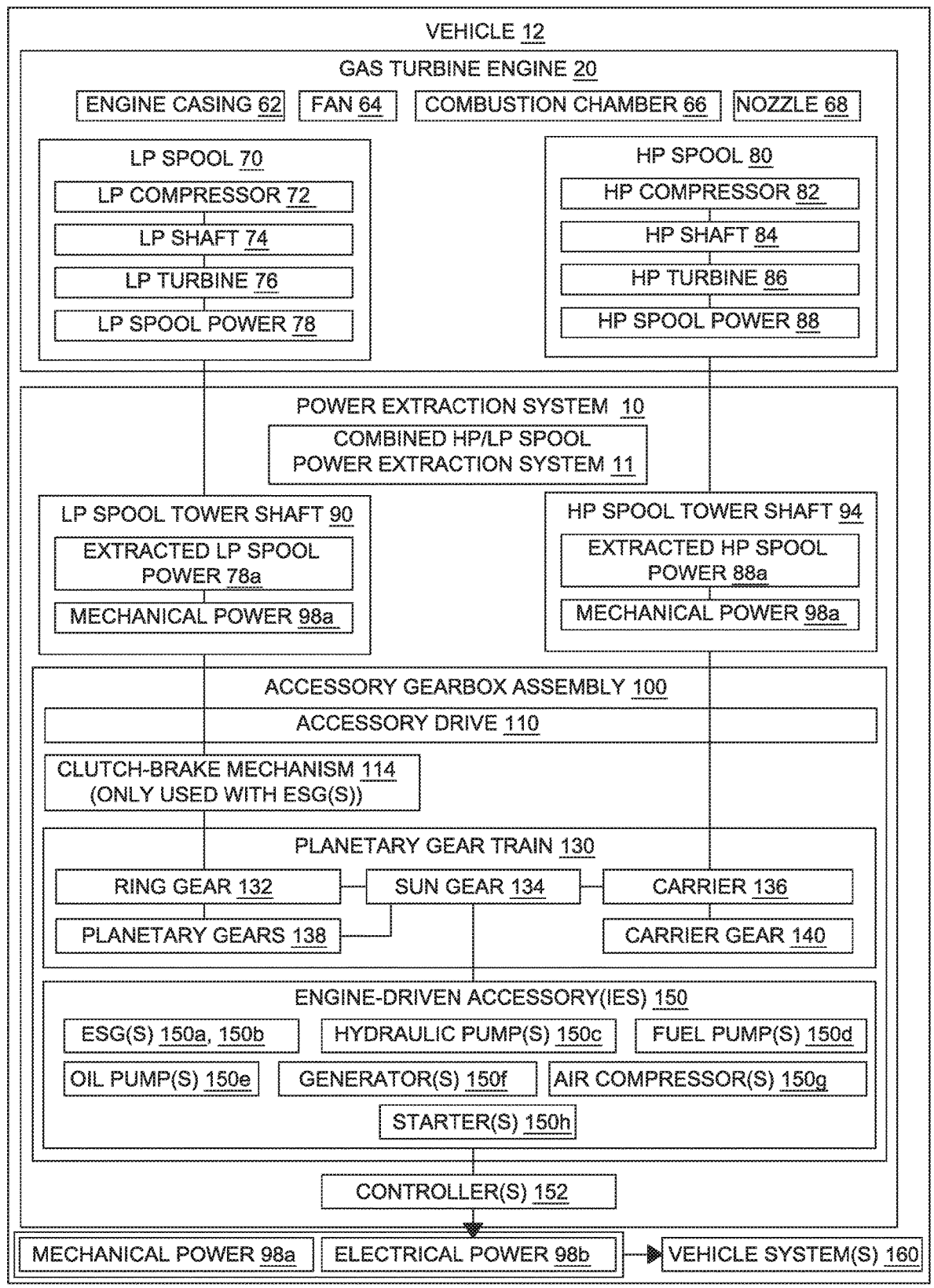
FIG. 4A is an illustration of a functional block diagram showing exemplary embodiments of a power extraction system of the disclosure for use with a gas turbine engine of a vehicle.
Figure 4B:
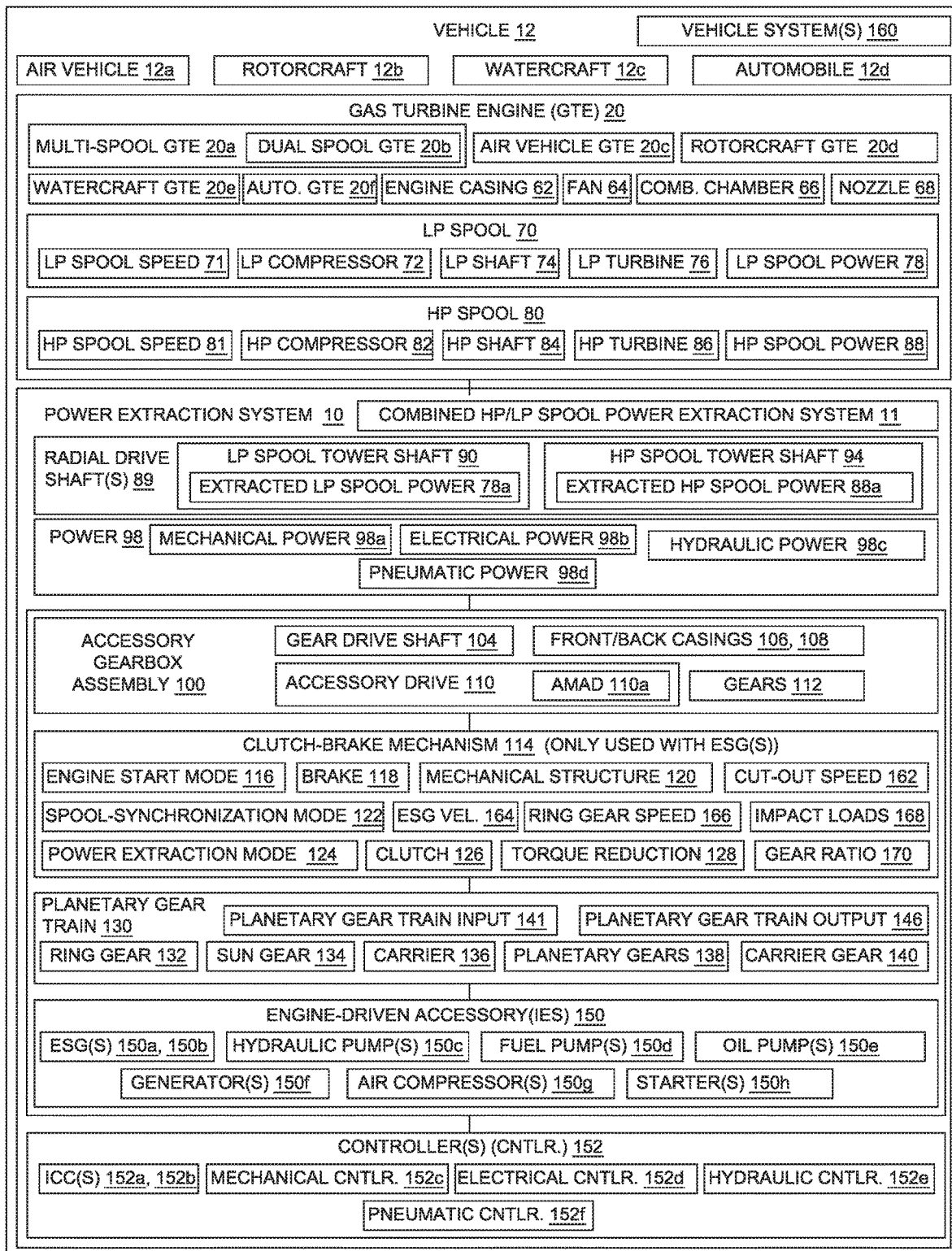
FIG. 4B is an illustration of a functional block diagram showing more detailed exemplary embodiments of the power extraction system of the disclosure for use with various gas turbine engines of various vehicles.
Figure 5:
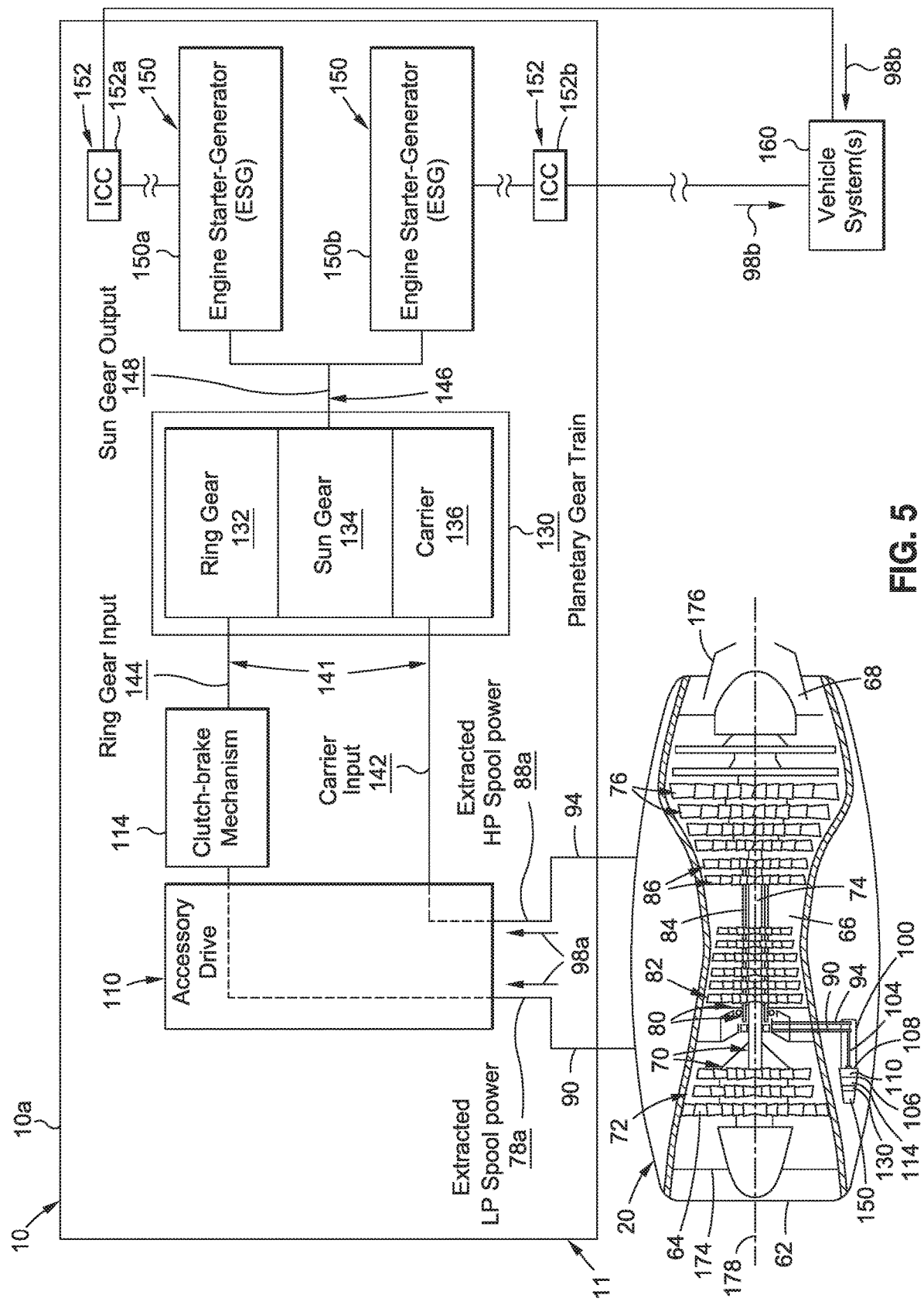
FIG. 5 is a schematic diagram of a cross-sectional view of an embodiment of a gas turbine engine and a block diagram system architecture of an exemplary embodiment of a power extraction system of the disclosure, that includes a clutch-brake mechanism and engine starter-generators.

Now referring to FIGS. 4A-4B and FIG. 5, FIG. 4A is an illustration of a functional block diagram showing exemplary embodiments of the power extraction system 10, such as in the form of combined HP/LP spool power extraction system 11, of the disclosure, for use with a gas turbine engine 20 of a vehicle 12, and FIG. 4B is an illustration of a functional block diagram showing more detailed exemplary embodiments of the power extraction system 10, such as in the form of combined HP/LP spool power extraction system 11, of the disclosure, for use with various gas turbine engines 20 of various vehicles 12. FIG. 5 is a schematic diagram of a cross-sectional view of an embodiment of a gas turbine engine 20 and a block diagram system architecture of an exemplary embodiment of a power extraction system 10 of the disclosure.

As shown in FIG. 4B, the vehicle 12 may comprise an air vehicle 12a, such as an aircraft 46 (see FIG. 3), a rotorcraft 12b or another suitable air vehicle, a watercraft 12c, an automobile 12d, or another suitable vehicle. The gas turbine engine (GTE) 20 (see FIGS. 4A-4B, 5) preferably comprises a multi-spool gas turbine engine 20a (see FIG. 4B), such as, for example, a dual spool gas turbine engine 20b (see FIG. 4B) having a low pressure (LP) spool 70 (see FIGS. 4A-4B, 5) and a high pressure (HP) spool 80 (see FIGS. 4A-4B, 5). As used herein, a "spool" means a rotating assembly. As shown in FIG. 4B, the gas turbine engine (GTE) 20 may comprise an air vehicle gas turbine engine (GTE) 20c, a rotorcraft gas turbine engine (GTE) 20d, a watercraft gas turbine engine (GTE) 20e, an automobile gas turbine engine (GTE) 20f, or another suitable gas turbine engine 20. For a vehicle 12 (see FIGS. 1, 4A-4B) having multiple gas turbine engines 20 (see FIGS. 1, 4A-4B), the power extraction system 10 (see FIGS. 1, 4A-4B) may be coupled to one gas turbine engine 20 (see FIGS. 1, 4A-4B), to each of the multiple gas turbine engines 20 (see FIGS. 1, 4A-4B), or to another desired number of the multiple gas turbine engines 20 (see FIGS. 4A-4B).

As shown in FIGS. 4A-4B and 5, the gas turbine engine 20 generally comprises an engine casing 62, a fan 64, a combustion chamber 66, a nozzle 68, the low pressure (LP) spool 70, and the high pressure (HP) spool 80. The gas turbine engine 20 (see FIGS. 4A-4B) may comprise other components depending on the type of gas turbine engine 20 used. The power extraction system 10 (see FIGS. 4A-4B, 5), such as in the form of combined HP/LP spool power extraction system 11 (see FIGS. 4A-4B, 5), uses mechanical power 98a (see FIGS. 4A-4B, 5) preferably provided by two spools comprising the HP spool 80 (see FIGS. 4A-4B, 5) and the LP spool 70 (see FIGS. 4A-4B, 5).

As further shown in FIGS. 4A-4B and 5, the LP spool 70 comprises a low pressure (LP) compressor 72, a low pressure (LP) shaft 74, and a low pressure (LP) turbine 76. The LP spool 70 (see FIGS. 4A-4B, 5) further has a low pressure (LP) spool speed 71 (see FIG. 4B) and generates a low pressure (LP) spool power 78 (see FIGS. 4A-4B).

As further shown in FIGS. 4A-4B and 5, the HP spool 80 comprises a high pressure (HP) compressor 82, a high pressure (HP) shaft 84, and a high pressure (HP) turbine 86. The HP spool 80 (see FIGS. 4A-4B, 5) further has a high pressure (HP) spool speed 81 (see FIG. 4B) and generates a high pressure (HP) spool power 88 (see FIGS. 4A-4B).

As shown in FIG. 5, the gas turbine engine 20 shows, in downstream serial flow relationship, the engine casing 62, the fan 64, the LP compressor 72, the HP compressor 82, the combustion chamber 66, the HP turbine 86, the LP turbine 76, and the nozzle 68. As further shown in FIG. 5, the HP shaft 84 drivingly connects the HP turbine 86 to the HP compressor 82, and the LP shaft 74 drivingly connects the LP turbine 76 to the LP compressor 72 and the fan 64. The LP shaft 74 (see FIG. 5) and the HP shaft 84 (see FIG. 5) are preferably concentrically aligned along a centerline 178 (see FIG. 5) of the gas turbine engine 20 (see FIG. 5) and the LP shaft 74 and the HP shaft 84 rotate mechanically free relative to one another. As further shown in FIG. 5, the gas turbine engine 20 has a front end 174 and a back end 176.

As shown in FIGS. 4A-4B and 5, the power extraction system 10, such as in the form of the combined HP and LP spool power extraction system 11, for the gas turbine engine 20 of the vehicle 12, comprises a high pressure (HP) spool tower shaft 94. The HP spool tower shaft 94 (see FIGS. 4A-4B, 5) is preferably in the form of a radial drive shaft 89 (see FIG. 4B) that is mechanically coupled between the HP shaft 84 (see FIGS. 4A-4B, 5) of the HP spool 80 (see FIGS. 4A-4B, 5) of the gas turbine engine 20 (see FIGS. 4A-4B, 5) of the vehicle 12 (see FIGS. 4A-4B, 5), and an accessory gearbox assembly 100 (see FIGS. 4A-4B, 5) coupled to the gas turbine engine 20. The HP spool tower shaft 94 (see FIGS. 4A-4B, 5) extracts mechanical power 98a (see FIGS. 4A-4B, 5) from the HP spool 80 (see FIGS. 4A-4B, 5) and transmits extracted HP spool power 88a (see FIGS. 4A-4B) from the HP spool 80 to an accessory drive 110 (see FIGS. 4A-4B, 5) of the accessory gearbox assembly 100 (see FIGS. 4A-4B, 5). The power extraction, or power off-take, of the mechanical power 98a (see FIGS. 4A-4B, 5) from the HP spool 80 preferably comprises mechanical shaft power extraction, or mechanical shaft power off-take.

As shown in FIGS. 4A-4B and 5, the power extraction system 10, such as in the form of the combined HP and LP spool power extraction system 11, for the gas turbine engine 20 of the vehicle 12, further comprises a low pressure (LP) spool tower shaft 90. The LP spool tower shaft 90 (see FIGS. 4A-4B, 5) is preferably in the form of a radial drive shaft 89 (see FIG. 4B) that is mechanically coupled between the LP shaft 74 (see FIGS. 4A-4B, 5) of the LP spool 70 (see FIGS. 4A-4B, 5) of the gas turbine engine 20 (see FIGS. 4A-4B, 5) of the vehicle 12 (see FIGS. 4A-4B, 5), and the accessory gearbox assembly 100 (see FIGS. 4A-4B, 5) coupled to the gas turbine engine 20. The LP spool tower shaft 90 (see FIGS. 4A-4B, 5) extracts mechanical power 98a (see FIGS. 4A-4B, 5) from the LP spool 70 (see FIGS. 4A-4B, 5) and transmits extracted LP spool power 78a (see FIGS. 4A-4B) from the LP spool 70 to the accessory drive 110 (see FIGS. 4A-4B, 5) of the accessory gearbox assembly 100 (see FIGS. 4A-4B, 5). The power extraction, or power off-take, of the mechanical power 98a (see FIGS. 4A-4B, 5) from the LP spool 70 preferably comprises mechanical shaft power extraction, or mechanical shaft power off-take.

The HP shaft 84 (see FIGS. 4A-4B) of the HP spool 80 (see FIGS. 4A-4B) and the LP shaft 74 (see FIGS. 4A-4B) of the LP spool 70 (see FIGS. 4A-4B) rotate independently at different speeds and have different operating ranges. For example, between the idling speed and the full gas speed, the speed ratio for the HP shaft 84 may be of the order of two, and the speed ratio for the LP shaft 74 may be of the order of five. The power extraction system 10 (see FIGS. 4A-4B) provides power extraction, or power off-take, that is preferably compatible with these two operating ranges of the HP spool 80 and the LP spool 70.

As shown in FIGS. 4A-4B and 5, the power extraction system 10, such as in the form of the combined HP and LP spool power extraction system 11, for the gas turbine engine 20 of the vehicle 12, further comprises the accessory gearbox assembly 100. The accessory gearbox assembly 100 (see FIG. 5) is preferably attached directly to the exterior of the engine casing 62 (see FIG. 5) at or near the bottom of the gas turbine engine 20 (see FIG. 5).

The accessory gearbox assembly 100 (see FIGS. 4A-4B, 5) comprises an accessory drive 110 (see FIGS. 4A-4B, 5). The accessory drive 110 (see FIG. 5) is preferably coupled to the HP spool 80 (see FIG. 5) and the LP spool 70 (see FIG. 5) of the gas turbine engine 20 (see FIG. 5), via the HP spool tower shaft 94 (see FIG. 5) and the LP spool tower shaft 90 (see FIG. 5), respectively, and via a gear drive shaft 104 (see FIGS. 4B, 5) coupled between the HP spool tower shaft 94 (see FIG. 5) and the LP spool tower shaft 90 (see FIG. 5) and the accessory drive 110. The HP spool tower shaft 94 (see FIGS. 4B, 5) and the LP spool tower shaft 90 (see FIGS. 4B, 5) may be separate radial drive shafts 89 (see FIG. 4B), or the LP spool tower shaft 90 (see FIGS. 4B, 5) may be concentric with the HP spool tower shaft 94 (see FIGS. 4B, 5).

The accessory drive 110 (see FIGS. 4B, 5) is preferably coupled between a front casing 106 (see FIGS. 4B, 5) and a back casing 108 (see FIGS. 4B, 5) of the accessory gearbox assembly 100 (see FIGS. 4B, 5), and the accessory drive 110 (see FIG. 4B) preferably comprises a plurality of gears 112 (see FIG. 4B). The accessory drive 110 (see FIG. 4B) may be in the form of an airframe-mounted accessory drive (AMAD) 110a (see FIG. 4B), or another suitable form of accessory drive. The accessory drive 110 (see FIGS. 4A-4B, 5) extracts and mechanically combines the mechanical power 98a (see FIGS. 4A-4B, 5) from both the HP spool 80 (see FIGS. 4A-4B, 5) and the LP spool 70 (see FIGS. 4A-4B, 5).

As shown in FIGS. 4A-4B and 5, the accessory gearbox assembly 100 further comprises a planetary gear train 130 coupled to the accessory drive 110. The planetary gear train 130 may also be referred to as an epicyclic gear train. The planetary gear train 130 (see FIGS. 4B, 5) is driven by a planetary gear train input 141 (see FIGS. 4B, 5) comprising a carrier input 142 (see FIG. 5) in the form of mechanical power 98a (see FIG. 5), such as extracted HP spool power 88a (see FIG. 5) from the HP spool 80 (see FIG. 5). The planetary gear train 130 (see FIGS. 4B, 5) is also driven by a planetary gear train input 141 (see FIGS. 4B, 5) comprising a ring gear input 144 (see FIG. 5) in the form of mechanical power 98a (see FIG. 5), such as extracted LP spool power 78a (see FIG. 5) from the LP spool 70 (see FIG. 5).

The planetary gear train 130 (see FIGS. 4A-4B, 5, 7A-7C) comprises a ring gear 132 (see FIGS. 4A-4B, 5, 7A-7C) driven by mechanical power 98a (see FIGS. 4A-4B, 5) extracted from the LP spool 70 (see FIGS. 4A-4B, 5). The planetary gear train 130 (see FIGS. 4A-4B, 5, 7A-7C) further comprises a carrier 136 (see FIGS. 4A-4B, 5, 7A-7C) driven by mechanical power 98a (see FIGS. 4A-4B, 5) extracted from the HP spool 80 (see FIGS. 4A-4B, 5). The planetary gear train 130 (see FIGS. 4A-4B, 5, 7A-7C) further comprises a sun gear 134 (see FIGS. 4A-4B, 5, 7A-7C) that generates a planetary gear train output 146 (see FIGS. 4B, 5) to drive one or more engine-driven accessories 150 (see FIGS. 4A-4B, 5). The planetary gear train 130 (see FIGS. 4A-4B, 7A-7C) further comprises one or more planetary gears 138 (see FIGS. 4A-4B) coupled to the ring gear 132 (see FIGS. 4A-4B, 7A-7C) and further comprises a carrier gear 140 (see FIGS. 4A-4B, 7B) coupled to the carrier 136 (see FIGS. 4A-4B, 7A-7C). The planetary gear train 130 (see FIGS. 4A-4B, 5, 7A-7C) is a passive (analog) device that does not require active control with a two-speed transmission or other type of transmission for the combined HP/LP power extraction. Unlike active control devices, passive devices may be less complicated, less expensive to implement and develop, and more reliable.

The planetary gear train 130 (see FIGS. 4A-4B, 5) is preferably an oil-lubricated power train connected between the accessory drive 110 (see FIGS. 4A-4B, 5), such as AMAD 110a (see FIG. 4B), and the one or more engine-driven accessories 150 (see FIGS. 4A-4B, 5), such as engine starter-generators (ESGs) 150a, 150 (see FIGS. 4A-4B, 5), or another suitable engine-driven accessory 150. The planetary gear train 130 (see FIGS. 4B, 5) may be incorporated into the accessory drive 110 (see FIGS. 4B, 5) to take advantage of oil lubrication and cooling. The planetary gear train 130 (see FIGS. 4A-4B, 5) mechanically connects the one or more engine-driven accessories 150 (see FIGS. 4A-4B, 5) to the HP spool 80 (see FIGS. 4A-4B, 5) and to the LP spool 70 (see FIGS. 4A-4B, 5).

As shown in FIGS. 4A-4B and 5, the accessory gearbox assembly 100 further comprises one or more engine-driven accessories 150 coupled to the planetary gear train 130. The one or more engine-driven accessories 150 (see FIGS. 4A-4B, 5) are driven by the planetary gear train output 146 (see FIG. 5) to generate power 98 (see FIGS. 4A-4B, 5) for use by one or more vehicle systems 160 (see FIGS. 4A-4B, 5) of the vehicle 12 (see FIGS. 4A-4B, 5). The one or more engine-driven accessories 150 (see FIGS. 4A-4B, 5) may comprise one or more of, one or more engine starter-generators 150a, 150b (see FIGS. 4A-4B, 5), a hydraulic pump 150c (see FIGS. 4A-4B, 8), a fuel pump 150d (see FIGS. 4A-4B), an oil pump 150e (see FIGS. 4A-4B), a generator 150f (see FIGS. 4A-4B), an air compressor 150g (see FIGS. 4A-4B), a starter 150h (see FIGS. 4A-4B), or another suitable engine-driven accessory 150. The accessory gearbox assembly 100 (see FIGS. 4A-4B, 5) may have attachment pads (not shown) or other suitable attachment mechanisms to attach the one or more engine-driven accessories 150 (see FIGS. 4A-4B, 5) to the accessory gearbox assembly 100 (see FIGS. 4A-4B, 5).

In one embodiment, as shown in FIG. 5, the power extraction system 10 includes engine-driven accessories 150, such as engine starter-generators (ESGs) 150a, 150b, that produce power 98 such as in the form of electrical power 98b. The electrical power 98b (see FIG. 5) may comprise, for example, direct current (DC) power from mechanical power 98a (see FIG. 5) supplied by the HP spool 80 (see FIG. 5), and alternating current (AC) power from mechanical power 98a (see FIG. 5) supplied by the LP spool 70 (see FIG. 5).

As shown in FIG. 4B, the power extraction system 10, such as in the form of combined HP/LP spool power extraction system 11, may extract or produce power 98, such as in the form of mechanical power 98a, electrical power 98b, hydraulic power 98c, pneumatic power 98d, or another suitable form of power 98. Preferably, the extracted LP spool power 78a (see FIGS. 4B, 5) and the extracted HP spool power 88a (see FIGS. 4B, 5) is in the form of mechanical power 98a (see FIGS. 4B, 5).

As shown in FIGS. 4B and 5, in one embodiment, the accessory gearbox assembly 100 of the power extraction system 10, such as in the form of combined HP/LP spool power extraction system 11, may further comprise a clutch-brake mechanism 114 coupled between the accessory drive 110 and a ring gear 132 of the planetary gear train 130. The clutch-brake mechanism 114 (see FIGS. 4B, 5) may be mounted to the front casing 106 (see FIGS. 4B, 5) of the accessory drive 110 (see FIGS. 4B, 5) or may be positioned in another suitable location.

The clutch-brake mechanism 114 (see FIGS. 4B, 5) connects and disconnects the planetary gear train 130 (see FIGS. 4B, 5) from the LP spool 70 (see FIGS. 4B, 5). With this embodiment, where the clutch-brake mechanism 114 (see FIGS. 4B, 5) is included or present, the one or more engine-driven accessories 150 (see FIGS. 4B, 5) preferably comprise two engine starter-generators 150a, 150b (see FIGS. 4B, 5), to generate power 98 (see FIGS. 4B, 5) comprising electrical power 98b (see FIGS. 4B, 5). The clutch-brake mechanism 114 (see FIGS. 4A-4B, 5) is preferably only used with one or more of the engine starter-generators 150a, 150b (see FIGS. 4A-4B, 5).

The function of the clutch-brake mechanism 114 (see FIGS. 4A-4B, 5) is to connect the ring gear 132 (see FIGS. 4B, 5) of the planetary gear train 130 (see FIGS. 4B, 5) to the LP spool 70 (see FIGS. 4B, 5), is to disconnect the ring gear 132 (see FIGS. 4B, 5) from the LP spool 70 (see FIGS. 4B, 5) and to brake or ground the ring gear 132 (see FIGS. 4B, 5) to a mechanical structure 120 (see FIG. 4B), and/or is to allow relative motion of the LP spool tower shaft 90 (see FIGS. 4B, 5) and the HP spool tower shaft 94 (see FIGS. 4B, 5), depending on the mode of operation of the gas turbine engine 20 (see FIGS. 4B, 5).

As shown in FIG. 4B, the clutch-brake mechanism 114 has an engine start mode 116 that disconnects the planetary gear train 130 from the LP spool 70 and brakes or grounds the ring gear 132 of the planetary gear train 130 to the mechanical structure 120. The clutch-brake mechanism 114 (see FIG. 4B) is energized or active in the engine start mode 116 (see FIG. 4B) and operates as a brake 118 (see FIG. 4B) by disconnecting or decoupling the planetary gear train 130 (see FIG. 4B) from the LP spool 70 (see FIG. 4B) and braking or grounding the ring gear 132 (see FIG. 4B) of the planetary gear train 130 (see FIG. 4B) to the mechanical structure 120 (see FIG. 4B). This maximizes a gear ratio 170 (see FIG. 4B) of the planetary gear train 130 (see FIG. 4B), for example, a gear ratio of 3.0:1 from a sun gear 134 (see FIG. 4B) to a carrier 136 (see FIG. 4B), in order to maximize a starting torque and minimize a current draw for the one or more engine starter generators (ESGs) 150a, 150b (see FIG. 4B). The one or more ESGs 150a, 150b (see FIG. 4B) operate in the engine start mode 116 (see FIG. 4B) or starter mode, and drive the HP spool 80 (see FIG. 4B) through the planetary gear train 130 (see FIG. 4B) to start the gas turbine engine 20 (see FIG. 4B).

As shown in FIG. 4B, the clutch-brake mechanism 114 further has a spool-synchronization mode 122 that transitions from the engine start mode 116 to a power extraction mode 124. The spool-synchronization mode 122 (see FIG. 4B) is intended to reduce impact loads 168 (see FIG. 4B) on the clutch-brake mechanism 114 (see FIG. 4B) during this transition. During the spool-synchronization mode 122 (see FIG. 4B), the ring gear 132 (see FIG. 4B) is allowed to spin freely relative to the LP shaft 74 (see FIG. 4B) of the LP spool 70 (see FIG. 4B).

Once the HP spool 80 (see FIG. 4B) reaches a cut-out speed 162 (see FIG. 4B), the clutch-brake mechanism 114 (see FIG. 4B) needs to release the brake 118 (see FIG. 4B) and reconnect with the LP spool 70 (see FIG. 4B), in order to transition to the power extraction mode 124 (see FIG. 4B). The LP spool speed 71 (see FIG. 4B) of the LP shaft 74 (see FIG. 4B) of the LP spool 70 (see FIG. 4B) is typically slower than a ring gear speed 166 (see FIG. 4B) of the ring gear 132 (see FIGS. 4B, 5) of the planetary gear train 130 (see FIG. 4B). With the brake 118 (see FIG. 4B) disengaged, a controller 152 (see FIGS. 4B, 5), such as in the form of one or more inverter/converter/controllers (ICCs) 152a, 152b (see FIGS. 4B, 5), operates the clutch-brake mechanism 114 (see FIGS. 4B, 5) in the spool-synchronization mode 122 (see FIG. 4B), and regulates an engine starter-generator (ESG) velocity 164 (see FIG. 4B), in order to match the ring gear speed 166 (see FIG. 4B) of the ring gear 132 (see FIG. 4B) to that of the LP spool speed 71 (see FIG. 4B) of the LP shaft 74 (see FIG. 4B) of the LP spool 70 (see FIG. 4B).

As shown in FIG. 4B, the clutch-brake mechanism 114 further has a power extraction mode 124 (also referred to as power generation mode), that connects the LP spool 70 to the ring gear 132 of the planetary gear train 130. Once the ring gear speed 166 (see FIG. 4B) and the LP spool speed 71 (see FIG. 4B) are within specified tolerances, the clutch-brake mechanism 114 (see FIG. 4B) is preferably set to the power extraction mode 124 (see FIG. 4B) and connects or couples the LP spool 70 (see FIG. 4B), such as the LP shaft 74 (see FIG. 4B) of the LP spool 70, to the ring gear 132 (see FIG. 4B) of the planetary gear train 130 (see FIG. 4B). The clutch-brake mechanism 114 (see FIG. 4B) is de-energized or passive in the power extraction mode 124 (see FIG. 4B) and operates as a clutch 126 (see FIG. 4B), by connecting or coupling the LP spool 70 (see FIG. 4B) to the ring gear 132 (see FIG. 4B) of the planetary gear train 130 (see FIG. 4B). The power extraction mode 124 (see FIG. 4B) is important for power generation.

The power extraction system 10 (see FIGS. 4A-4B, 5), such as in the form of combined HP/LP spool power extraction system 11 (see FIGS. 4A-4B, 5), enables increased extraction of power 98 (see FIGS. 4A-4B, 5) with a decreased number of engine starter-generators (ESGs) 150a, 150b (see FIGS. 4A-4B, 5), as compared to known power extraction systems and methods. In addition, the power extraction system 10 (see FIGS. 4A-4B, 5), such as in the form of combined HP/LP spool power extraction system 11 (see FIGS. 4A-4B, 5), reduces torque required from the one or more engine starter-generators (ESGs) 150a, 150b (see FIGS. 4A-4B, 5), thus resulting in a torque reduction 128 (see FIG. 4B). Further, the power extraction system 10 (see FIGS. 4A-4B, 5), such as in the form of combined HP/LP spool power extraction system 11 (see FIGS. 4A-4B, 5), enables faster transient power extraction with simpler electric architecture, and by using the inertia of both the HP spool 80 (see FIGS. 4A-4B, 5) and the LP spool 70 (see FIGS. 4A-4B, 5) to a single engine starter-generator 150a (see FIGS. 4A-4B, 5), no parallel connection of multiple generators extracting power individually from the LP shaft 74 and the HP shaft 84 is needed.

In the power extraction mode 124 (see FIG. 4B), HP spool power 88 (see FIG. 4B) from the HP spool 80 (see FIGS. 4B, 5) transmits through the accessory drive 110 (see FIG. 5) as extracted HP spool power 88a (see FIG. 5) that functions as planetary gear train input 141, such as in the form of carrier input 142 (see FIG. 5), to drive the carrier 136 (see FIGS. 4B, 5) of the planetary gear train 130 (see FIGS. 4B, 5). In addition, the LP spool power 78 (see FIG. 4B) from the LP spool 70 (see FIGS. 4B, 5) transmits through the accessory drive 110 (see FIG. 5) as extracted LP spool power 78a (see FIG. 5) that functions as planetary gear train input 141, such as in the form of ring gear input 144 (see FIG. 5), to drive the ring gear 132 (see FIGS. 4B, 5) of the planetary gear train 130 (see FIG. 4B). Planetary gear train output 146 (see FIGS. 4B, 5), such as in the form of sun gear output 148 (see FIG. 5), from the sun gear 134 (see FIGS. 4B, 5) of the planetary gear train 130 (see FIGS. 4B, 5), drives the one or more engine-driven accessories 150 (see FIGS. 4B, 5), such as in the form of engine starter-generators (ESGs) 150a, 150b (see FIGS. 4B, 5).

In the power extraction mode 124 (see FIG. 4B), the one or more engine starter-generators (ESGs) 150a, 150b (see FIGS. 4B, 5) take LP spool power 78 (see FIG. 4B) from the LP spool 70 (see FIGS. 4B, 5) and take HP spool power 88 (see FIG. 4B) from the HP spool 80 (see FIGS. 4B, 5) to generate electrical power 98b (see FIGS. 4B, 5) to the vehicle 12 (see FIGS. 1, 4B), such as the air vehicle 12a (see FIGS. 1, 4B). The clutch-brake mechanism 114 (see FIGS. 4B, 5) is de-energized, and the controller 152 (see FIGS. 4B, 5), such as in the form of ICCs 152a, 152b (see FIGS. 4A, 5) takes electrical power 98b (see FIGS. 4B, 5) from the one or more engine-driven accessories 150 (see FIGS. 4B, 5), such as in the form of engine starter-generators (ESGs) 150a, 150b (see FIGS. 4B, 5), and supplies one or more vehicle systems 160 (see FIG. 4B), such as a propulsion system 54 (see FIG. 3), an electrical system 56 (see FIG. 3), a hydraulic system 58 (see FIG. 3), or an environmental system 60 (see FIG. 3) of the vehicle 12 (see FIG. 1), such as an aircraft 46 (see FIG. 3), or another suitable vehicle system 160.

As shown in FIGS. 4A-4B and 5, the power extraction system 10, such as in the form of combined HP/LP spool power extraction system 11, may further comprise one or more controllers 152 coupled to the one or more engine-driven accessories 150 to control the one or more engine-driven accessories 150, and to regulate the power 98 generated by the one or more engine-driven accessories 150, and used by the one or more vehicle systems 160 of the vehicle 12. As shown in FIG. 4B, the controller (cntlr.) 152 may comprise one or more inverter/converter/controllers (ICCs) 152*a*, 152*b* (see also FIG. 5), a mechanical controller 152*c*, an electrical controller 152*d*, a hydraulic controller 152*e*, a pneumatic controller 152*f*, or another suitable controller. The ICCs 152*a*, 152*b* (see FIGS. 4B, 5) manage operation of the engine starter-generators 150*a*, 150*b* (see FIGS. 4B, 5), respectively, and manage operation of the clutch-brake mechanism 114 (see FIGS. 4B, 5). During the power extraction mode 124 (see FIG. 4B), the one or more ICCs 152*a*, 152*b* (see FIGS. 4B, 5) filter and regulate the electrical power 98*b* (see FIGS. 4B, 5) generated by the one or more ESGs 150*a*, 150*b* (see FIGS. 4B, 5), and supply the electrical power 98*b* (see FIGS. 4B, 5) to one or more vehicle systems 160 (see FIGS. 4B, 5) of the vehicle 12 (see FIG. 4B). During engine start mode 116 (see FIG. 4B), the one or more ICCs 152*a*, 152*b* (see FIGS. 4B, 5) control the states of the clutch-brake mechanism 114 (see FIGS. 4B, 5) and the one or more ESGs 150*a*, 150*b* (see FIGS. 4B, 5), respectively.

FIG. 5 shows a schematic diagram of a cross-sectional view of an embodiment of the gas turbine engine 20 and a block diagram system architecture of an exemplary embodiment of the power extraction system 10, such as in the form of power extraction system 10*a*, of the disclosure, that includes a clutch-brake mechanism 114 and engine starter-generators 150*a*, 150*b*. Preferably, the power extraction system 10 is an HP/LP spool power extraction system 11.

As discussed above, FIG. 5 shows the gas turbine engine 20, including the engine casing 62, the fan 64, the LP compressor 72, the HP compressor 82, the combustion chamber 66, the HP turbine 86, the LP turbine 76, and the nozzle 68. As further shown in FIG. 5, the HP shaft 84 drivingly connects the HP turbine 86 to the HP compressor 82, and the LP shaft 74 drivingly connects the LP turbine 76 to the LP compressor 72 and the fan 64.

As shown in FIG. 5, the gas turbine engine 20 is coupled to the accessory gearbox assembly 100 of the power extraction system 10, via the LP spool tower shaft 90 and the HP spool tower shaft 94. The HP spool tower shaft 94 (see FIG. 5) is preferably coupled between the HP shaft 84 (see FIG. 5) and the gear drive shaft 104 (see FIG. 5) of the accessory gearbox assembly 100 (see FIG. 5). The HP spool tower shaft 94 (see FIG. 5) provides extracted HP spool power 88*a* (see FIG. 5) from the HP spool 80 (see FIGS. 4A-4B), such as in the form of mechanical power 98*a* (see FIG. 4A), to drive, via the planetary gear train 130 (see FIG. 5), the engine-driven accessories 150 (see FIG. 5), such as the engine starter-generators 150*a*, 150*b* (see FIG. 5).

The LP spool tower shaft 90 (see FIG. 5) is preferably coupled between the LP shaft 74 (see FIG. 5) and the gear drive shaft 104 (see FIG. 5) of the accessory gearbox assembly 100 (see FIG. 5). The LP spool tower shaft 90 (see FIG. 5) provides extracted LP spool power 78*a* (see FIG. 5) from the LP spool 70 (see FIGS. 4A-4B), such as in the form of mechanical power 98*a* (see FIG. 4A), to also drive, via the planetary gear train 130 (see FIG. 5), the engine-driven accessories 150 (see FIG. 5), such as the engine starter-generators 150*a*, 150*b* (see FIG. 5).

FIG. 5 further shows the gear drive shaft 104 connecting the LP spool tower shaft 90 and the HP spool tower shaft 94 to the accessory drive 110 which may be positioned between the front casing 106 and the back casing 108 of the accessory gearbox assembly 100. In this embodiment of the power extraction system 10, such as power extraction system 10*a*, shown in FIG. 5, the clutch-brake mechanism 114 is preferably mounted to, or incorporated into, the accessory drive 110, and the planetary gear train 130 is preferably incorporated into the accessory drive 110. As further shown in FIG. 5, the accessory gearbox assembly 100 comprises one or more engine-driven accessories 150, such as in the form of engine starter-generators 150*a*, 150*b*, and the engine starter-generators 150*a*, 150*b* are coupled via wires or wirelessly to controllers 152, such as in the form of inverter/converter/controllers (ICC) 152*a*, 152*b*, respectively.

FIG. 5 shows the block diagram system architecture of the power extraction system 10, such as in the form of power extraction system 10*a*, for the gas turbine engine 20. As shown in FIG. 5, the block diagram system architecture shows the LP spool tower shaft 90 providing extracted LP spool power 78*a*, such as mechanical power 98*a*, through the accessory drive 110 from the LP shaft 74 of the LP spool 70 of the gas turbine engine 20, and through the clutch-brake mechanism 114, and as ring gear input 144 to the ring gear 132 of the planetary gear train 130, in order to drive the ring gear 132.

As further shown in FIG. 5, the block diagram system architecture shows the HP spool tower shaft 94 providing extracted HP spool power 88*a*, such as mechanical power 98*a*, through the accessory drive 110 from the HP shaft 84 of the HP spool 80 of the gas turbine engine 20, and as carrier input 142 to the carrier 136 of the planetary gear train 130, in order to drive the carrier 136. Planetary gear train output 146 (see FIG. 5), such as in the form of sun gear output 148 (see FIG. 5), is generated from the sun gear 134 (see FIG. 5) and drives the engine starter-generators 150*a*, 150*b* (see FIG. 5). The engine starter-generators 150*a*, 150*b* (see FIG. 5) take the mechanical power 98*a* (see FIG. 4A) from the combination of the HP spool 80 (see FIG. 4A) and the LP spool 70 (see FIG. 4A) to generate electrical power 98*b* (see FIG. 4A). The controllers 152 (see FIG. 5), such as the ICCs 152*a*, 152*b* (see FIG. 5), take the electrical power 98*b* (see FIG. 5) from the respective engine starter-generators 150*a*, 150*b* (see FIG. 5) and supply the electrical power 98*b* (see FIG. 5) to one or more vehicle systems 160 (see FIG. 5), for example, the propulsion system 54 (see FIG. 3), the electrical system 56 (see FIG. 3), the hydraulic system 58 (see FIG. 3), the environmental system 60 (see FIG. 3), or another suitable system, of the vehicle 12 (see FIGS. 1, 4A-4B), such as the air vehicle 12*a* (see FIGS. 1, 4A-4B), for example, an aircraft 46 (see FIG. 3).

Figure 6A:
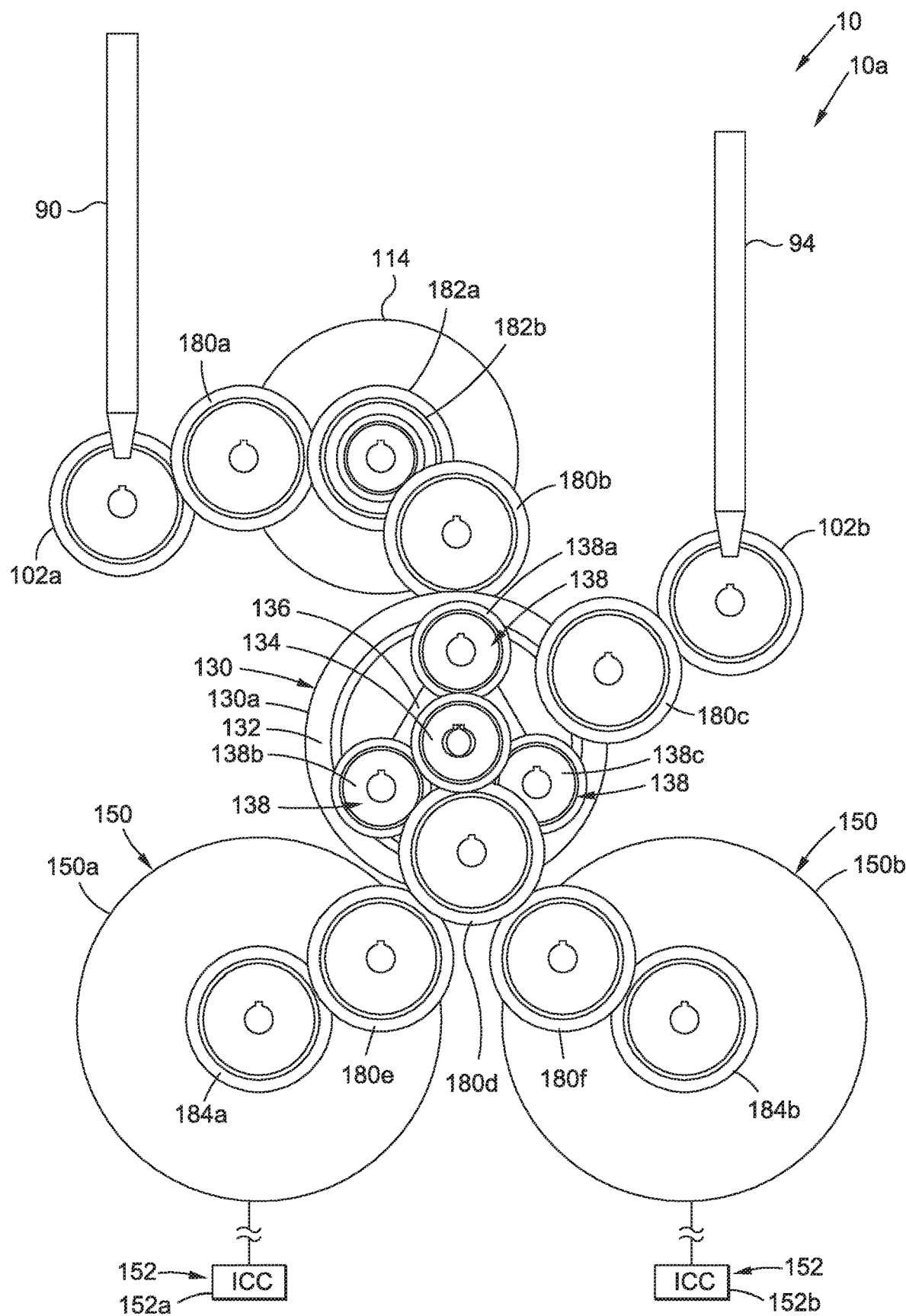
FIG. 6A is a schematic diagram of a front view of an exemplary embodiment of a power extraction system of the disclosure.
Figure 6B:
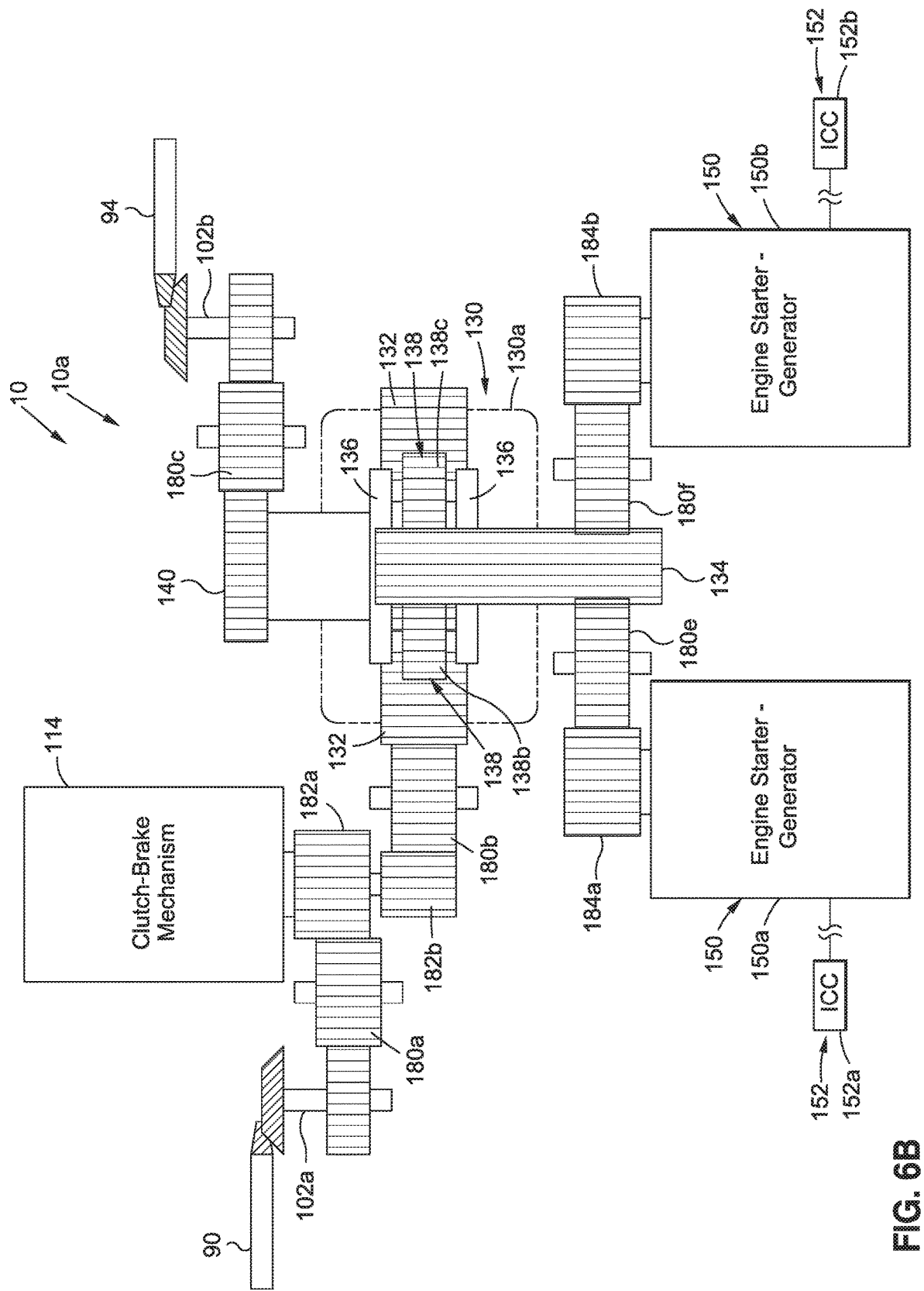
FIG. 6B is a schematic diagram of a top view of the power extraction system of FIG. 6A.

Now referring to FIGS. 6A-6B, FIG. 6A is a schematic diagram of a front view of an exemplary embodiment of a power extraction system 10, such as in the form of power extraction system 10*a*, of the disclosure. FIG. 6B is a schematic diagram of a top view of the power extraction system 10, such as in the form of power extraction system 10*a*, of FIG. 6A.

FIGS. 6A-6B show the LP spool tower shaft 90 coupled to an LP (low pressure) spool bevel-spur gear assembly 102*a*, which is coupled to an idler gear 180*a*, which is coupled to a clutch-brake mechanism input spur gear 182*a*. As further shown in FIGS. 6A-6B, the clutch-brake mechanism 114 is also coupled to the clutch-brake mechanism input spur gear 182*a*, which is coupled to a clutch-brake mechanism output spur gear 182*b*, which is coupled to an idler gear 180*b*. As further shown in FIGS. 6A-6B, the idler gear 180*b* is coupled to the ring gear 132 of the planetary gear train 130, such as in the form of planetary gear train 130*a*. The planetary gear train 130 (see FIGS. 6A-6B) further comprises the planetary gears 138, such as planetary gears 138*a*, 138*b*, 138*c* (see FIGS. 6A-6B), and further comprises the sun gear 134 (see FIGS. 6A-6B) and the carrier 136 (see FIGS. 6A-6B). The carrier 136 (see FIGS. 6A-6B) is coupled to the carrier gear 140 (see FIG. 6B), which is coupled to an idler gear 180c(see FIGS. 6A-6B), which is coupled to an HP spool bevel-spur gear assembly 102b (see FIGS. 6A-6B). The HP spool bevel-spur gear assembly 102b (see FIGS. 6A-6B) is coupled to the HP spool tower shaft (see FIGS. 6A-6B).

As further shown in FIG. 6A, the sun gear 134 of the planetary gear train 130 is coupled to an idler gear 180d, which is coupled to idler gears 180e, 180f. Idler gear 180e (see FIGS. 6A-6B) is coupled to an engine starter-generator input spur gear 184a (see FIGS. 6A-6B), which is coupled to the engine-driven accessory 150 (see FIGS. 6A-6B), such as in the form of engine starter-generator 150a see FIGS. 6A-6B). The engine starter-generator 150a (see FIGS. 6A-6B) is preferably coupled to a controller 152 (see FIGS. 6A-6B), such as in the form of inverter/converter/controller 152a (see FIGS. 6A-6B).

Idler gear 180f (see FIGS. 6A-6B) is coupled to an engine starter-generator input spur gear 184b (see FIGS. 6A-6B), which is coupled to the engine-driven accessory 150 (see FIGS. 6A-6B), such as in the form of engine starter-generator 150b (see FIGS. 6A-6B). The engine starter-generator 150b (see FIGS. 6A-6B) is preferably coupled to a controller 152 (see FIGS. 6A-6B), such as in the form of inverter/converter/controller 152b (see FIGS. 6A-6B).

Now referring to FIGS. 7A-7B, FIG. 7A is a schematic diagram of a front view of an exemplary embodiment of a planetary gear train 130, such as in the form of planetary gear train 130a, that may be used in embodiments of the power extraction system 10 (see FIGS. 4A-4B), of the disclosure, and FIG. 7B is a schematic diagram of a top view of the planetary gear train 130, such as in the form of planetary gear train 130a, of FIG. 7A.

As shown in FIGS. 7A-7B, the planetary gear train 130, such as in the form of planetary gear train 130a, comprises the ring gear 132 coupled to the planetary gears 138, such as in the form of planetary gears 138a, 138b, 138c, which are coupled to the sun gear 134. The carrier 136 (see FIGS. 7A-7B), which supports the planetary gears 138, is coupled to the carrier gear 140 (see FIG. 7B). The sun gear 134 meshes with the planetary gears 138, and the planetary gears 138 mesh with the ring gear 132.

Now referring to FIG. 7C, FIG. 7C is a schematic diagram of a front view of another exemplary embodiment of a planetary gear train 130, such as in the form of planetary gear train 130b, that may used in embodiments of the power extraction system 10 (see FIGS. 4A-4B), of the disclosure. As shown in FIG. 7C, the planetary gear train 130, such as in the form of planetary gear train 130b, comprises the ring gear 132 having a ring gear circular interior opening 185 lined with ring gear teeth 186.

As further shown in FIG. 7C, various of the ring gear teeth 186 may engage with and couple to the planetary gears 138, such as in the form of planetary gears 138a, 138b, 138c. The planetary gears 138, in turn, couple to the sun gear 134. As shown in FIG. 7C, each planetary gear 138 has an exterior 187 lined with planetary gear teeth 188 that are designed or configured to engage with the ring gear teeth 186 and the sun gear teeth 192. Each planetary gear 138 (see FIG. 7C), such as in the form of planetary gears 138a, 138b, 138c (see FIG. 7C) has a planetary gear center opening 189 (see FIG. 7C) that aligns with and is coupled to a carrier attachment point 196 (see FIG. 7C) formed in the carrier 136. The carrier 136 (see FIG. 7C) has a carrier interior opening 198 of a size configured to enclose the sun gear 134.

As further shown in FIG. 7C, the planetary gear train 130, such as in the form of planetary gear train 130b, comprises the sun gear 134. The carrier 136 (see FIG. 7C) may also be coupled to a carrier gear 140 (see FIG. 7B). As shown in FIG. 7C, the sun gear 134 has a substantially circular exterior 190 lined with sun gear teeth 192, and has a sun gear center opening 194.

Figure 8:
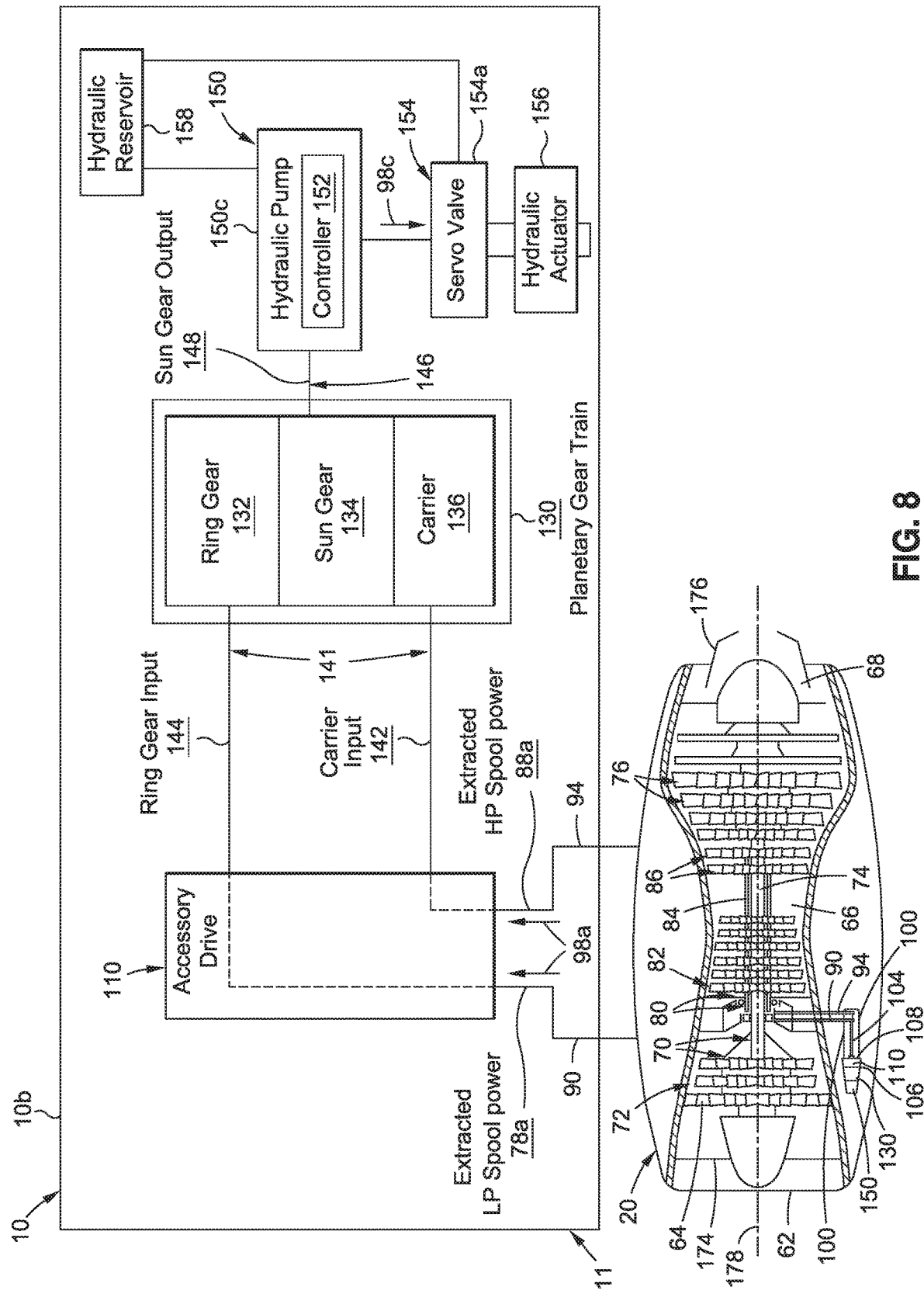
FIG. 8 is a schematic diagram of a cross-sectional view of an embodiment of a gas turbine engine and a block diagram system architecture of another exemplary embodiment of a power extraction system of the disclosure, that includes a hydraulic pump.

Now referring to FIG. 8, FIG. 8 is a schematic diagram of a cross-sectional view of an embodiment of a gas turbine engine 20 and a block diagram system architecture of another exemplary embodiment of a power extraction system 10, such as in the form of power extraction system 10b, of the disclosure, that includes an engine-driven accessory 150, in the form of a hydraulic pump 150c, instead of engine starter-generators 150a, 150b (see FIG. 5), and that does not include the clutch-brake mechanism 114 (see FIG. 5). Preferably, the power extraction system 10 is an HP/LP spool power extraction system 11.

Similar to FIG. 5, as shown in FIG. 8, the gas turbine engine 20 includes, in downstream serial flow relationship, the engine casing 62, the fan 64, the LP compressor 72, the HP compressor 82, the combustion chamber 66, the HP turbine 86, the LP turbine 76, and the nozzle 68. As further shown in FIG. 8, the HP shaft 84 drivingly connects the HP turbine 86 to the HP compressor 82, and the LP shaft 74 drivingly connects the LP turbine 76 to the LP compressor 72 and the fan 64. The gas turbine engine 20 (see FIG. 8) has the front end 174 (see FIG. 8) and the back end 176 (see FIG. 8). The LP shaft 74 (see FIG. 8) and the HP shaft 84 (see FIG. 8) are preferably concentrically aligned along the centerline 178 (see FIG. 8) of the gas turbine engine 20 (see FIG. 8) and rotate mechanically free with respect to one another.

As further shown in FIG. 8, the gas turbine engine 20 is coupled to the power extraction system 10, such as in the form of power extraction system 10b, for example, the HP/LP spool power extraction system 11, having the LP spool tower shaft 90 and the HP spool tower shaft 94 drivingly connected between the gas turbine engine 20 and the accessory gearbox assembly 100. The HP spool tower shaft 94 (see FIG. 8) is preferably coupled between the HP shaft 84 (see FIG. 8) and the gear drive shaft 104 (see FIG. 8) of the accessory gearbox assembly 100 (see FIG. 8). The HP spool tower shaft 94 (see FIG. 8) provides extracted HP spool power 88a (see FIG. 8) from the HP shaft 84 of the HP spool 80 (see FIGS. 4A-4B), such as in the form of mechanical power 98a (see FIG. 4A), to drive, via the planetary gear train 130 (see FIG. 8), the engine-driven accessory 150 (see FIG. 8), such as the hydraulic pump 150c (see FIG. 8).

The LP spool tower shaft 90 (see FIG. 8) is preferably coupled between the LP shaft 74 (see FIG. 8) and the gear drive shaft 104 (see FIG. 8) of the accessory gearbox assembly 100 (see FIG. 8). The LP spool tower shaft 90 (see FIG. 8) provides extracted LP spool power 78a (see FIG. 8) from the LP shaft 74 (see FIG. 8) of the LP spool 70 (see FIGS. 4A-4B), such as in the form of mechanical power 98a (see FIG. 4A), to drive, via the planetary gear train 130 (see FIG. 8), the engine-driven accessory 150 (see FIG. 8), such as the hydraulic pump 150c (see FIG. 8).

The HP spool tower shaft 94 (see FIG. 8) and the LP spool tower shaft 90 (see FIG. 8) may be separate shafts or they may be concentrically aligned together, for example, the LP spool tower shaft 90 (see FIG. 8) may be concentrically positioned within the HP spool tower shaft 94 (see FIG. 8). Preferably, the HP spool tower shaft 94 (see FIG. 8) and the LP spool tower shaft 90 (see FIG. 8) are radial drive shafts 89 (see FIG. 4B).

As further shown in FIG. 8, the accessory gearbox assembly 100 comprises the gear drive shaft 104 drivingly connecting the LP spool tower shaft 90 and the HP spool tower shaft 94 to the accessory drive 110 of the accessory gearbox assembly 100. The accessory drive 110 (see FIG. 8) may be positioned between the front casing 106 (see FIG. 8) and the back casing 108 (see FIG. 8) of the accessory gearbox assembly 100 (see FIG. 8). In this embodiment of the power extraction system 10 (see FIG. 8), such as power extraction system 10b (see FIG. 8), there is no clutch-brake mechanism 114 (see FIG. 5), and the planetary gear train 130 (see FIG. 8) is preferably incorporated directly into the accessory drive 110 (see FIG. 8). As further shown in FIG. 8, the accessory gearbox assembly 100 comprises the engine-driven accessory 150, such as in the form of hydraulic pump 150c, and the hydraulic pump 150c includes a controller 152. Although only one hydraulic pump 150c and one controller 152 are shown in FIG. 8, more than one hydraulic pump 150c and/or more than one controller 152 may be used.

FIG. 8 shows the block diagram system architecture of the power extraction system 10, such as in the form of power extraction system 10b, for the gas turbine engine 20. As shown in FIG. 8, the block diagram system architecture shows the LP spool tower shaft 90 providing extracted LP spool power 78a, such as in the form of mechanical power 98a, through the accessory drive 110 from the LP shaft 74 of the LP spool 70 (see FIG. 4A) of the gas turbine engine 20, and as planetary gear train input 141, such as ring gear input 144 to the ring gear 132 of the planetary gear train 130, in order to drive the ring gear 132.

As further shown in FIG. 8, the block diagram system architecture shows the HP spool tower shaft 94 providing extracted HP spool power 88a, such as in the form of mechanical power 98a, through the accessory drive 110 from the HP shaft 84 of the HP spool 80 (see FIG. 4A) of the gas turbine engine 20, and as planetary gear train input 141, such as carrier input 142 to the carrier 136 of the planetary gear train 130, in order to drive the carrier 136. Planetary gear train output 146 (see FIG. 8), such as in the form of sun gear output 148 (see FIG. 8), is generated from the sun gear 134 (see FIG. 8) and drives the hydraulic pump 150c (see FIG. 8).

As further shown in FIG. 8, the engine-driven accessory 150, such as in the form of hydraulic pump 150c, is connected or coupled to a control valve 154, such as a servo valve 154a. As further shown in FIG. 8, the control valve 154, such as in the form of servo valve 154a, may be connected or coupled to a hydraulic actuator 156. As further shown in FIG. 8, the engine-driven accessory 150, such as in the form of hydraulic pump 150c, is connected or coupled to a hydraulic reservoir 158, and the hydraulic reservoir 158 is connected or coupled to the control valve 154, such as in the form of servo valve 154a. The servo valve 154a (see FIG. 8) is a control valve 154 (see FIG. 8) that is electrically operated and is closed-loop and that controls how hydraulic fluid is ported to the hydraulic actuator 156 (see FIG. 8).

The hydraulic pump 150c (see FIG. 8) is a mechanical source of power that converts the mechanical power 98a (see FIG. 8) received from the planetary gear train output 146 (see FIG. 8) from the HP spool 80 (see FIG. 8) and the LP spool 70 (see FIG. 8) into hydraulic power 98c (see FIG. 8) to power the hydraulic actuator 156 (see FIG. 8). When the hydraulic pump 150c (see FIG. 8) operates, it creates a vacuum at a hydraulic pump inlet, which forces the hydraulic fluid from the hydraulic reservoir 158 (see FIG. 8) into the inlet line to the hydraulic pump (see FIG. 8) and by mechanical action delivers the hydraulic fluid to the hydraulic pump outlet and forces it into a hydraulic system.

Figure 9A:
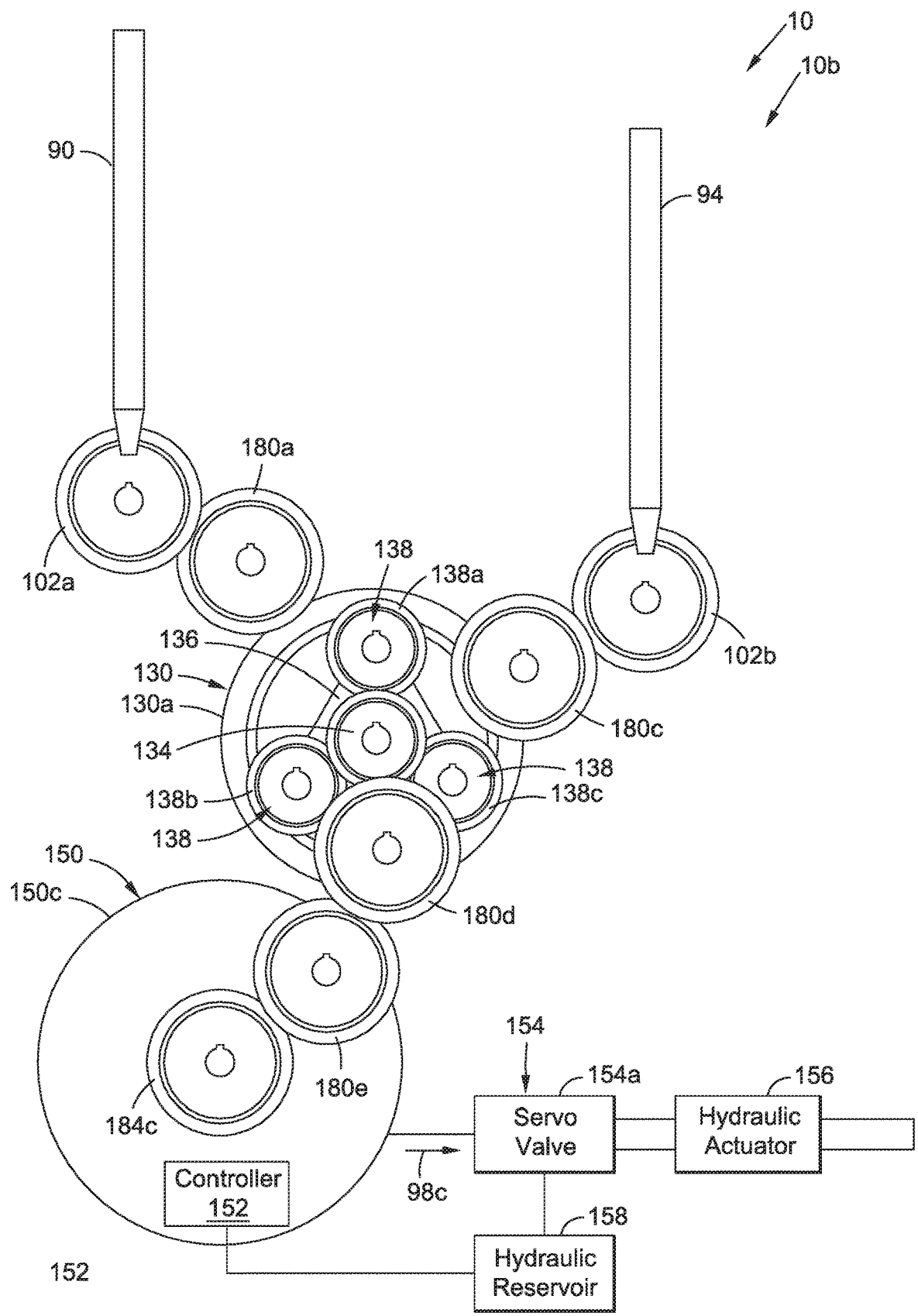
FIG. 9A is a schematic diagram of a front view of another exemplary embodiment of a power extraction system of the disclosure.
Figure 9B:
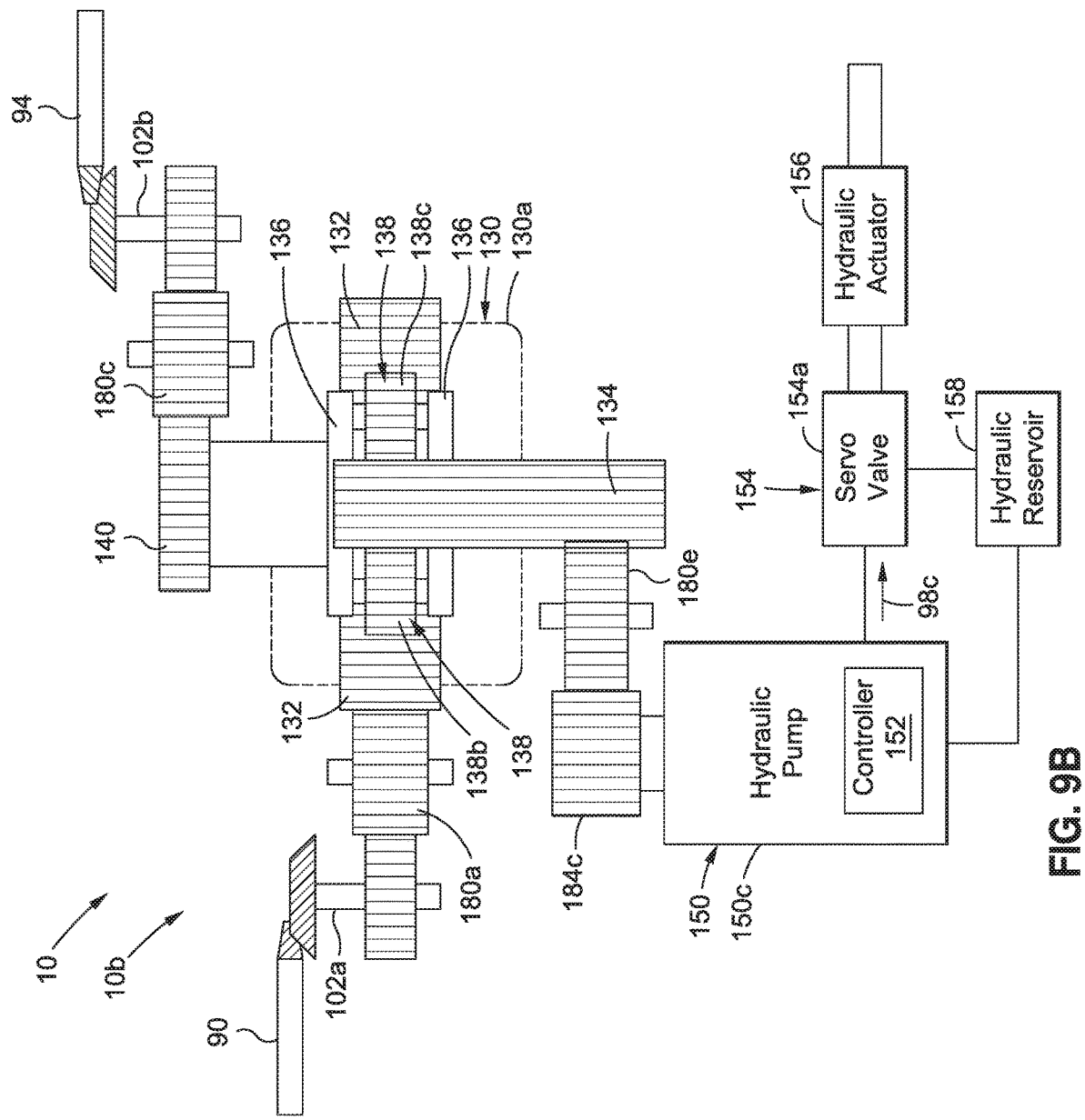
FIG. 9B is a schematic diagram of a top view of the power extraction system of FIG. 9A.

Now referring to FIGS. 9A-9B, FIG. 9A is a schematic diagram of a front view of another exemplary embodiment of a power extraction system 10, such as in the form of power extraction system 10b, of the disclosure, and FIG. 9B is a schematic diagram of a top view of the power extraction system 10, such as in the form of power extraction system 10b, of FIG. 9A.

FIGS. 9A-9B show the LP spool tower shaft 90 coupled to the LP spool bevel-spur gear assembly 102a, which is coupled to the idler gear 180a, which is coupled to the ring gear 132 of the planetary gear train 130, such as in the form of planetary gear train 130a. The planetary gear train 130 (see FIGS. 9A-9B) further comprises planetary gears 138 (see FIGS. 9A-9B), such as planetary gears 138a, 138b, 138c (see FIGS. 9A-9B), which are coupled to the sun gear 134 (see FIGS. 9A-9B). The carrier 136 (see FIGS. 9A-9B), which supports the planetary gears 138, is coupled to the carrier gear 140 (see FIG. 9B), which is coupled to idler gear 180c (see FIGS. 9A-9B), which is coupled to the HP spool bevel-spur gear assembly 102b (see FIGS. 9A-9B). The HP spool bevel-spur gear assembly 102b (see FIGS. 9A-9B) is coupled to the HP spool tower shaft (see FIGS. 9A-9B).

As further shown in FIG. 9A, the sun gear 134 of the planetary gear train 130 is coupled to the idler gear 180d, and the idler gear 180d is coupled to the idler gear 180e. Idler gear 180e (see FIGS. 9A-9B) is coupled to a hydraulic pump input spur gear 184c (see FIGS. 9A-9B), which is coupled to the engine-driven accessory 150 (see FIGS. 9A-9B), such as in the form of hydraulic pump 150c (see FIGS. 9A-9B). The hydraulic pump 150c (see FIGS. 9A-9B) includes a controller 152 (see FIGS. 9A-9B). As further shown in FIGS. 9A-9B, the hydraulic pump 150c is connected or coupled to the control valve 154, such as in the form of servo valve 154a, and the servo valve 154a, which is connected or coupled to the hydraulic actuator 156. As further shown in FIGS. 9A-9B, the engine-driven accessory 150, such as in the form of hydraulic pump 150c, is connected or coupled to the hydraulic reservoir 158, and the hydraulic reservoir 158 is connected or coupled to the control valve 154, such as in the form of servo valve 154a.

In another embodiment, there is provided an air vehicle 12a (see FIGS. 1, 4B) comprising a fuselage 16 (see FIG. 1), at least one wing 18 (see FIG. 1) connected to the fuselage 16 (see FIG. 1), and at least one multi-spool gas turbine engine 20a (see FIGS. 1, 4B) coupled to the at least one wing 18 (see FIG. 1). The at least one multi-spool gas turbine engine 20a (see FIGS. 1, 4B) has an HP spool 80 (see FIG. 4B) and an LP spool 70 (see FIG. 4B).

The air vehicle 12a (see FIGS. 1, 4B) further comprises a combined HP/LP spool power extraction system 11 (see FIGS. 1, 4B) coupled to the HP spool 80 (see FIG. 4B) and to the LP spool 70 (see FIG. 4B) of the at least one multi-spool gas turbine engine 20a (see FIGS. 1, 4B). The combined HP/LP spool power extraction system 11 (see FIGS. 1, 4B) comprises an HP spool tower shaft 94 (see FIG. 4B) mechanically coupled between the HP spool 80 (see FIG. 4B) and an accessory gearbox assembly 100 (see FIG. 4B) coupled to the at least one multi-spool gas turbine engine 20a (see FIG. 4B). The HP spool tower shaft 94 (see FIG. 4B) extracts mechanical power 98a (see FIG. 4B) from the HP spool 80 (see FIG. 4B).

The combined HP/LP spool power extraction system 11 (see FIG. 4B) further comprises a low pressure (LP) spool tower shaft 90 (see FIG. 4B) mechanically coupled between the LP spool 70 (see FIG. 4B) and the accessory gearbox assembly 100 (see FIG. 4B). The LP spool tower shaft 90 (see FIG. 4B) extracts mechanical power 98a (see FIG. 4B) from the LP spool 70 (see FIG. 4B).

The combined HP/LP spool power extraction system 11 (see FIG. 4B) further comprises the accessory gearbox assembly 100 (see FIG. 4B). As discussed in detail above, the accessory gearbox assembly 100 (see FIG. 4B) comprises an accessory drive 110 (see FIG. 4B) coupled to the HP spool tower shaft 94 (see FIG. 4B) and coupled to the LP spool tower shaft 90 (see FIG. 4B). The accessory drive 110 (see FIG. 4B) extracts and mechanically combines the mechanical power 98a (see FIG. 4B) from both the HP spool 80 (see FIG. 4B) and the LP spool 70 (see FIG. 4B).

The accessory gearbox assembly 100 (see FIG. 4B) further comprises the planetary gear train 130 (see FIG. 4B) coupled to or mounted to or within the accessory drive 110 (see FIG. 4B). As discussed in detail above, the planetary gear train 130 (see FIG. 4B) comprises the ring gear 132 (see FIG. 4B) driven by mechanical power 98a (see FIG. 4B) extracted from the LP spool 70 (see FIG. 4B). The planetary gear train 130 (see FIG. 4B) further comprises the carrier 136 (see FIG. 4B) driven by mechanical power 98a (see FIG. 4B) extracted from the HP spool 80 (see FIG. 4B). The planetary gear train 130 (see FIG. 4B) further comprises the sun gear 134 (see FIG. 4B) that generates a planetary gear train output 146 (see FIG. 4B).

As discussed in detail above, the accessory gearbox assembly 100 (see FIG. 4B) further comprises one or more engine-driven accessories 150 (see FIG. 4B) coupled to the planetary gear train 130 (see FIG. 4B). The one or more engine-driven accessories 150 (see FIG. 4B) are driven by the planetary gear train output 146 (see FIG. 4B) to generate power 98 (see FIG. 4B) for use by one or more vehicle systems 160 (see FIG. 4B) of the air vehicle 12a (see FIG. 4B), such as a propulsion system 54 (see FIG. 3), an electrical system 56 (see FIG. 3), a hydraulic system 58 (see FIG. 3), or an environmental system 60 (see FIG. 3) of the vehicle 12 (see FIG. 1), such as an aircraft 46 (see FIG. 3), or another suitable vehicle system 160.

The accessory gearbox assembly 100 (see FIG. 4B) of the combined HP/LP spool power extraction system 11 (see FIGS. 1, 4B) may further optionally comprise a clutch-brake mechanism 114 (see FIG. 4B) coupled between the accessory drive 110 (see FIG. 4B) and the ring gear 132 (see FIG. 4B) of the planetary gear train 130 (see FIG. 4B). As discussed in detail above, the clutch-brake mechanism 114 (see FIG. 4B) connects and disconnects the planetary gear train 130 (see FIG. 4B) from the LP spool 70 (see FIG. 4B), and with this embodiment, where the clutch-brake mechanism 114 (see FIG. 4B) is present, the one or more engine-driven accessories 150 (see FIG. 4B) comprise two engine starter-generators 150a, 150b (see FIG. 4B), to generate power 98 (see FIG. 4B) comprising electrical power 98b (see FIG. 4B).

As discussed in detail above, the clutch-brake mechanism 114 (see FIG. 4B) has the engine start mode 116 (see FIG. 4B) that disconnects the planetary gear train 130 (see FIG. 4B) from the LP spool 70 (see FIG. 4B) and brakes or grounds the ring gear 132 (see FIG. 4B) of the planetary gear train 130 (see FIG. 4B) to a mechanical structure 120 (see FIG. 4B). The clutch-brake mechanism 114 (see FIG. 4B) further has the power extraction mode 124 (see FIG. 4B) that connects the LP spool 70 (see FIG. 4B) to the ring gear 132 (see FIG. 4B) of the planetary gear train 130 (see FIG. 4B). The clutch-brake mechanism 114 (see FIG. 4B) further has the spool-synchronization mode 122 (see FIG. 4B) that transitions from the engine start mode 116 (see FIG. 4B) to the power extraction mode 124 (see FIG. 4B).

The combined HP/LP spool power extraction system 11 (see FIGS. 1, 4B) may further comprise one or more controllers 152 (see FIG. 4B) coupled to the one or more engine-driven accessories 150 (see FIG. 4B) to control the one or more engine-driven accessories 150 (see FIG. 4B), and to regulate the power 98 (see FIG. 4B) generated by the one or more engine-driven accessories 150 (see FIG. 4B) and used by the one or more vehicle systems 160 (see FIG. 4B) of the air vehicle 12a (see FIG. 4B).

The one or more engine-driven accessories 150 (see FIG. 4B) may comprise one or more of, one or more engine starter-generators (ESGs) 150a, 150b (see FIG. 4B), a hydraulic pump 150c (see FIG. 4B), a fuel pump 150d (see FIG. 4B), an oil pump 150e (see FIG. 4B), a generator 150f (see FIG. 4B), an air compressor 150g (see FIG. 4B), a starter 150h (see FIG. 4B), or another suitable engine-driven accessory 150 (see FIG. 4B).

Figure 10:
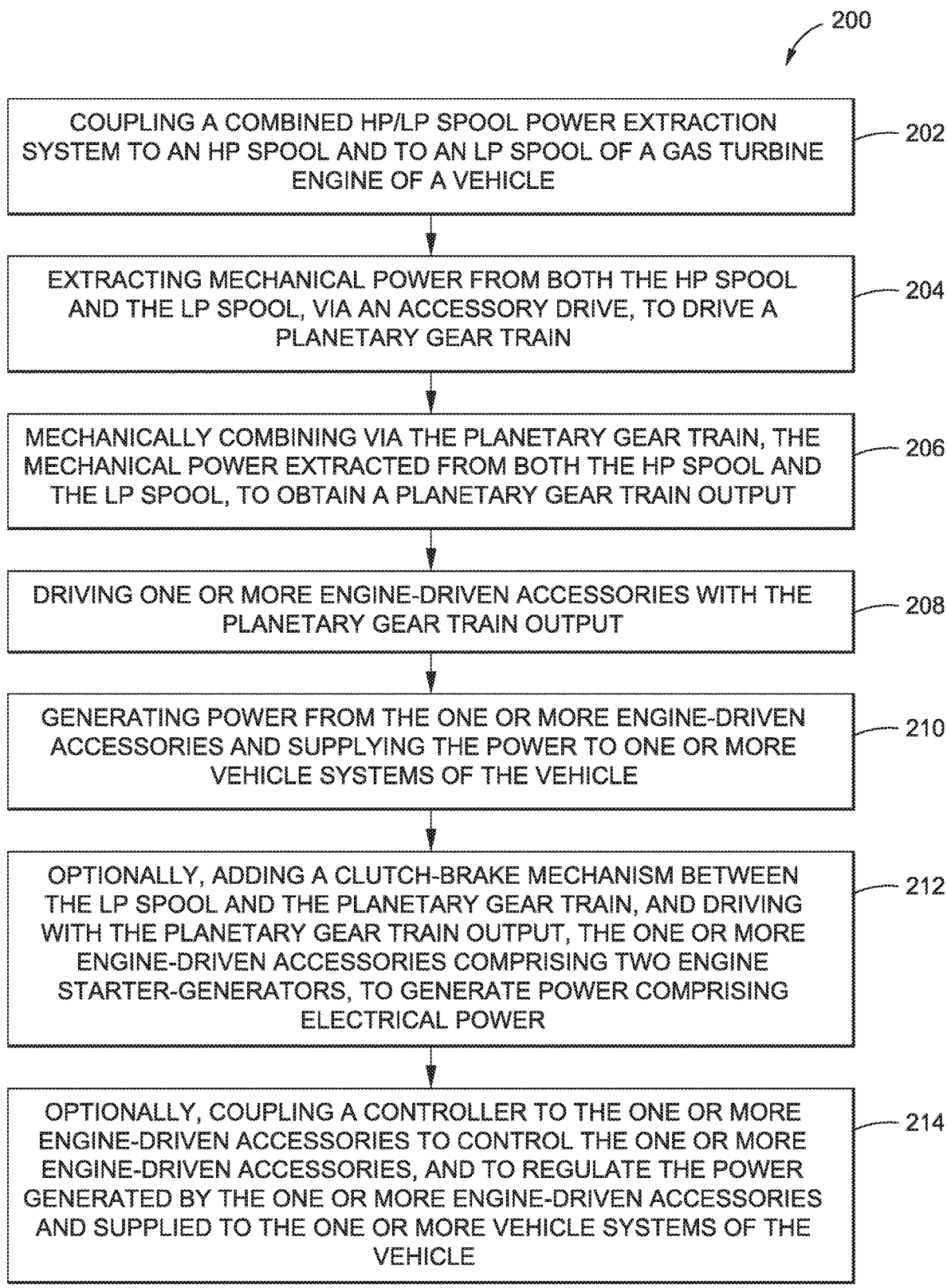
FIG. 10 is an illustration of a flow diagram showing an exemplary embodiment of a method of the disclosure of extracting power for a gas turbine engine of a vehicle.

Now referring to FIG. 10, in another embodiment there is provided a method 200 of extracting power 98 (see FIG. 4B), such as mechanical power 98a (see FIG. 4B), from both the high pressure (HP) spool 80 (see FIGS. 4A-4B) and the low pressure (LP) spool 70 (see FIGS. 4A-4B) for a gas turbine engine 20 (see FIGS. 1, 4A-4B) of a vehicle 12 (see FIGS. 1, 4A-4B), to drive one or more engine-driven accessories 150 (see FIGS. 4A-4B). FIG. 10 is an illustration of a flow diagram showing an exemplary embodiment of the method 200 of the disclosure of extracting power 98 (see FIG. 4B) for the gas turbine engine 20 (see FIGS. 1, 4A-4B) of the vehicle 12 (see FIGS. 1, 4A-4B).

As shown in FIG. 10, the method 200 comprises step 202 of coupling the combined HP/LP spool power extraction system 11 (see FIGS. 4A-4B) to the HP spool 80 (see FIGS. 4A-4B) and to the LP spool 70 (see FIGS. 4A-4B) of the gas turbine engine 20 (see 1, FIGS. 4A-4B) of the vehicle 12 (see FIGS. 1, 4A-4B). As discussed in detail above, the combined HP/LP spool power extraction system 11 (see FIGS. 4A-4B) comprises the accessory gearbox assembly 100 (see FIGS. 4A-4B) which comprises the accessory drive 110 (see FIGS. 4A-4B), the planetary gear train 130 (see FIGS. 4A-4B) coupled to the accessory drive 110, and one or more engine-driven accessories 150 (see FIGS. 4A-4B) coupled to the planetary gear train 130.

As shown in FIGS. 4A-4B, the one or more engine-driven accessories 150 may comprise one or more of, one or more engine starter-generator 150a, 150b, the hydraulic pump 150c, the fuel pump 150d, the oil pump 150e, the generator 150f, the air compressor 150g, and the starter 150h, or another suitable engine-driven accessory 150. Preferably, the one or more engine-driven accessories 150 (see FIGS. 4A-4B, 5) comprise two engine starter-generators 150a, 150b (see FIGS. 4A-4B, 5) to generate power 98 (see FIG. 4B) comprising electrical power 98b (see FIGS. 4A-4B, 5). In another embodiment, as shown in FIG. 8, the engine-driven accessory 150 may comprise the hydraulic pump 150c generating hydraulic power 98c (see FIGS. 4B, 8).

The combined HP/LP spool power extraction system 11 (see FIGS. 4A-4B) further comprises the high pressure (HP) spool tower shaft 94 (see FIGS. 4A-4B) mechanically coupled between the HP spool 80 (see FIGS. 4A-4B) and the accessory gearbox assembly 100 (see FIGS. 4A-4B). The combined HP/LP spool power extraction system 11 (see FIGS. 4A-4B) further comprises the low pressure (LP) spool tower shaft 90 (see FIGS. 4A-4B) mechanically coupled between the LP spool 70 (see FIGS. 4A-4B) and the accessory gearbox assembly 100 (see FIGS. 4A-4B).

As shown in FIG. 10, the method 200 further comprises step 204 of extracting mechanical power 98a (see FIGS. 4A-4B) from both the HP spool 80 (see FIGS. 4A-4B) and the LP spool 70 (see FIGS. 4A-4B), via the accessory drive 110 (see FIGS. 4A-4B), to drive the planetary gear train 130 (see FIGS. 4A-4B). The step 204 (see FIG. 10) of extracting mechanical power 98a (see FIGS. 4A-4B) from both the HP spool 80 (see FIGS. 4A-4B) and the LP spool 70 (see FIGS. 4A-4B), via the accessory drive 110 (see FIGS. 4A-4B), to drive the planetary gear train 130 (see FIGS. 4A-4B), comprises extracting mechanical power 98a (see FIGS. 4A-4B) from the HP spool 80 (see FIGS. 4A-4B) to drive the carrier 136 (see FIGS. 4A-4B) of the planetary gear train 130 (see FIGS. 4A-4B), and extracting mechanical power 98a (see FIGS. 4A-4B) from the LP spool 70 (see FIGS. 4A-4B) to drive the ring gear 132 (see FIGS. 4A-4B) of the planetary gear train 130 (see FIGS. 4A-4B).

As shown in FIG. 10, the method 200 further comprises step 206 of mechanically combining, via the planetary gear train 130 (see FIGS. 4A-4B), the mechanical power 98a (see FIGS. 4A-4B) extracted from both the HP spool 80 (see FIGS. 4A-4B) and the LP spool 70 (see FIGS. 4A-4B), to obtain the planetary gear train output 146 (see FIGS. 4A-4B).

As shown in FIG. 10, the method 200 further comprises step 208 of driving the one or more engine-driven accessories 150 (see FIGS. 4A-4B) with the planetary gear train output 146 (see FIGS. 4A-4B). The step 208 (see FIG. 10) of driving the one or more engine-driven accessories 150 (see FIGS. 4A-4B) with the planetary gear train output 146 (see FIGS. 4A-4B), comprises driving the one or more engine-driven accessories 150 (see FIGS. 4A-4B) with the planetary gear train output 146 (see FIGS. 4A-4B) comprising the sun gear output 148 (see FIGS. 4A-4B) from the sun gear 134 of the planetary gear train 130.

As shown in FIG. 10, the method 200 further comprises step 210 of generating power 98 (see FIG. 4B) from the one or more engine-driven accessories 150 (see FIGS. 4A-4B) and supplying the power 98 to one or more vehicle systems 160 (see FIGS. 4A-4B) of the vehicle 12 (see FIGS. 4A-4B). The one or more vehicle systems 160 (see FIG. 5) may comprise, for example, the propulsion system 54 (see FIG. 3), the electrical system 56 (see FIG. 3), the hydraulic system 58 (see FIG. 3), the environmental system 60 (see FIG. 3), or another suitable system, of the vehicle 12 (see FIGS. 1, 4A-4B), such as the air vehicle 12a (see FIGS. 1, 4A-4B), for example, an aircraft 46 (see FIG. 3).

As shown in FIG. 10, the method 200, in one embodiment, may further optionally comprise step 212 of adding the clutch-brake mechanism 114 (see FIGS. 4A-4B, 5) between the LP spool 70 (see FIGS. 4A-4B, 5) and the planetary gear train 130 (see FIGS. 4A-4B, 5), and driving with the planetary gear train output 146 (see FIGS. 4B, 5), the one or more engine-driven accessories 150 (see FIGS. 4B, 5) comprising two engine starter-generators 150a, 150b (see FIGS. 4B, 5), to generate power 98 (see FIG. 4B) comprising electrical power 98b (see FIGS. 4B, 5).

The step 212 (see FIG. 10) may further comprise using the clutch-brake mechanism 114 (see FIGS. 4A-4B) in the engine start mode 116 (see FIG. 4B) to disconnect the planetary gear train 130 (see FIGS. 4A-4B) from the LP spool 70 (see FIGS. 4A-4B) and to brake or ground the ring gear 132 (see FIGS. 4A-4B) of the planetary gear train 130 (see FIGS. 4A-4B) to the mechanical structure 120 (see FIG. 4B). As discussed in detail above, the clutch-brake mechanism 114 (see FIGS. 4A-4B) is energized or active in the engine start mode 116 (see FIG. 4B) and operates as the brake 118 (see FIG. 4B) by disconnecting or decoupling the planetary gear train 130 (see FIGS. 4A-4B) from the LP spool 70 (see FIGS. 4A-4B) and braking or grounding the ring gear 132 (see FIGS. 4A-4B) of the planetary gear train 130 (see FIGS. 4A-4B) to the mechanical structure 120 (see FIG. 4B). This maximizes the gear ratio 170 (see FIG. 4B) of the planetary gear train 130 (see FIG. 4B) and maximizes the starting torque and minimizes the current draw for the one or more engine starter generators (ESGs) 150a, 150b (see FIG. 4B). The one or more ESGs 150a, 150b (see FIG. 4B) operate in the engine start mode 116 (see FIG. 4B) or starter mode, and drive the HP spool 80 (see FIGS. 4B, 5) through the planetary gear train 130 (see FIGS. 4B, 5) to start the gas turbine engine 20 (see FIGS. 4B, 5).

The step 212 (see FIG. 10) may further comprise using the clutch-brake mechanism 114 (see FIGS. 4A-4B) in the spool-synchronization mode 122 (see FIG. 4B) to transition from the engine start mode 116 (see FIG. 4B) to the power extraction mode 124 (see FIG. 4B). As discussed above in detail, the spool-synchronization mode 122 (see FIG. 4B) is intended to reduce impact loads 168 (see FIG. 4B) on the clutch-brake mechanism 114 (see FIGS. 4B, 5) during this transition. During the spool-synchronization mode 122 (see FIG. 4B), the ring gear 132 (see FIG. 4B) is allowed to spin freely relative to the LP shaft 74 (see FIGS. 4B, 5) of the LP spool 70 (see FIGS. 4B, 5).

Once the HP spool 80 (see FIGS. 4B, 5) reaches the cut-out speed 162 (see FIG. 4B), the clutch-brake mechanism 114 (see FIGS. 4B, 5) needs to release the brake 118 (see FIG. 4B) and reconnect with the LP spool 70 (see FIGS. 4B, 5), in order to transition to the power extraction mode 124 (see FIG. 4B). As discussed above, the LP spool speed 71 (see FIG. 4B) of the LP shaft 74 (see FIGS. 4B, 5) is typically slower than the ring gear speed 166 (see FIG. 4B) of the ring gear 132 (see FIGS. 4B, 5) of the planetary gear train 130 (see FIG. 4B). With the brake 118 (see FIG. 4B) disengaged, the controller 152 (see FIGS. 4B, 5), such as in the form of one or more inverter/converter/controllers (ICCs) 152a, 152b (see FIGS. 4B, 5), operates the clutch-brake mechanism 114 (see FIGS. 4B, 5) in the spool-synchronization mode 122 (see FIG. 4B), and regulates the engine starter-generator (ESG) velocity 164 (see FIG. 4B), in order to match the ring gear speed 166 (see FIG. 4B) of the ring gear 132 (see FIGS. 4B, 5) to that of the LP spool speed 71 (see FIG. 4B) of the LP shaft 74 (see FIGS. 4B, 5).

The step 212 (see FIG. 10) may further comprise using the clutch-brake mechanism 114 (see FIGS. 4A-4B) in the power extraction mode 124 (see FIG. 4B) (also referred to as the power generation mode), to connect the LP spool 70 (see FIGS. 4B, 5) to the ring gear 132 (see FIGS. 4B, 5) of the planetary gear train 130 (see FIGS. 4B, 5). Once the ring gear speed 166 (see FIG. 4B) and the LP spool speed 71 (see FIG. 4B) are within specified tolerances, the clutch-brake mechanism 114 (see FIGS. 4B, 5) is preferably set to the power extraction mode 124 (see FIG. 4B) and connects or couples the LP spool 70 (see FIGS. 4B, 5), such as the LP shaft 74 (see FIGS. 4B, 5) of the LP spool 70, to the ring gear 132 (see FIGS. 4B, 5) of the planetary gear train 130 (see FIGS. 4B, 5). As discussed in detail above, the clutch-brake mechanism 114 (see FIGS. 4A-4B) is de-energized or passive in the power extraction mode 124 (see FIG. 4B) and operates as the clutch 126 (see FIG. 4B) by connecting or coupling the LP spool 70 (see FIGS. 4A-4B) to the ring gear 132 (see FIGS. 4B, 5) of the planetary gear train 130 (see FIGS. 4B, 5). The power extraction mode 124 (see FIG. 4B) is important for power generation.

As discussed above, in the power extraction mode 124 (see FIG. 4B), the HP spool power 88 (see FIG. 4B) from the HP spool 80 (see FIGS. 4B, 5) that becomes the extracted HP spool power 88a functions as planetary gear train input 141 (see FIG. 5) comprising carrier input 142 (see FIG. 5) to drive the carrier 136 (see FIGS. 4B, 5) of the planetary gear train 130 (see FIGS. 4B, 5). As further discussed above, in the power extraction mode 124 (see FIG. 4B), the LP spool power 78 (see FIG. 4B) from the LP spool 70 (see FIGS. 4B, 5) that becomes the extracted LP spool power 78a functions as planetary gear train input 141 (see FIG. 5) comprising ring gear input 142 (see FIG. 5) to drive the ring gear 132 (see FIGS. 4B, 5) of the planetary gear train 130 (see FIGS. 4B). Planetary gear train output 146 (see FIGS. 4B, 5), such as in the form of sun gear output 148 (see FIG. 5), from the sun gear 134 (see FIGS. 4B, 5) of the planetary gear train 130 (see FIGS. 4B, 5), drives the one or more engine-driven accessories 150 (see FIGS. 4B, 5), such as in the form of engine starter-generators (ESGs) 150a, 150b (see FIGS. 4B, 5). In the power extraction mode 124 (see FIG. 4B), the one or more ESGs 150a, 150b (see FIGS. 4B, 5) take LP spool power 78 (see FIG. 4B) from the LP spool 70 (see FIGS. 4B, 5) and take HP spool power 88 (see FIG. 4B) from the HP spool 80 (see FIGS. 4B, 5) to generate electrical power 98b (see FIGS. 4B, 5) to the vehicle 12 (see FIGS. 1, 4B), such as an air vehicle 12a (see FIGS. 1, 4B).

As shown in FIG. 10, the method 200 may further optionally comprise step 214 of coupling the controller 152 (see FIGS. 4A-4B) to the one or more engine-driven accessories 150 (see FIGS. 4A-4B) to control the one or more engine-driven accessories 150, and to regulate the power 98 (see FIG. 4B) generated by the one or more engine-driven accessories 150 (see FIGS. 4A-4B) and supplied to the one or more vehicle systems 160 (see FIGS. 4A-4B) of the vehicle 12 (see FIGS. 4A-4B). As shown in FIG. 4B, the controller (cntlr.) 152 may comprise one or more inverter/converter/controllers (ICCs) 152a, 152b (see also FIG. 5), a mechanical controller 152c, an electrical controller 152d, a hydraulic controller 152e, a pneumatic controller 152f, or another suitable controller. The ICCs 152a, 152b (see FIG. 5) manage operation of the engine starter-generators (ESGs) 150a, 150b (see FIGS. 5), respectively, and manage operation of the clutch-brake mechanism 114 (see FIG. 5). During the power extraction mode 124 (see FIG. 4B), the one or more ICCs 152a, 152b (see FIG. 5) filter and regulate the electrical power 98b (see FIGS. 4B, 5) generated by the one or more ESGs 150a, 150b (see FIGS. 5), and supply the electrical power 98b (see FIGS. 4B, 5) to one or more vehicle systems 160 (see FIG. 4B) of the vehicle 12 (see FIG. 4B). During the engine start mode 116 (see FIG. 4B), the one or more ICCs 152a, 152b (see FIG. 5) control the states of the clutch-brake mechanism 114 (see FIGS. 4B, 5) and the one or more ESGs 150a, 150b (see FIG. 5), respectively.

Disclosed embodiments of the power extraction system 10 (see FIGS. 4A-4B), such as in the form of combined HP/LP spool power extraction system 11 (see FIGS. 4A-4B), and the method 200 (see FIG. 10) provide systems and methods for extraction of mechanical power 98a (see FIGS. 4A-4B, 5, 8) from both the HP (high pressure) spool 80 (see FIGS. 4A-4B, 5, 8) and the LP (low pressure) spool 70 (see FIGS. 4A-4B, 5, 8) of a gas turbine engine 20 (see FIGS. 1, 4A-4B, 5, 8), such as a multi-spool gas turbine engine 20a (see FIGS. 1, 4B) of a vehicle 12 (see FIGS. 1, 4A-4B), in order to drive one or more engine-driven accessories 150 (see FIGS. 4A-4B, 5, 8), such as, for example, one or more engine starter-generators (ESGs) 150a, 150b (see FIGS. 4A-4B, 5), or a hydraulic pump 150c (see FIGS. 4B, 8), or another suitable engine-driven accessory 150 (see FIGS. 4A-4B), for generating power 98 (see FIGS. 4A-4B), such as mechanical power 98a (see FIG. 4B), electrical power 98b (see FIGS. 4B, 5), hydraulic power 98c (see FIGS. 4B, 8), or pneumatic power 98d (see FIG. 4B), for one or more vehicle systems 160 (see FIGS. 4A-4B) of the vehicle 12 (see FIGS. 4A-4B). The power extraction, or power off-take, from the LP spool 70 (see FIGS. 4A-4B, 5, 8) and the HP spool (see FIGS. 4A-4B, 5, 8) are combined via a planetary gear train 130 (see FIGS. 4A-4B), and the planetary gear train output 146 (see FIG. 4B) is connected to the one or more engine-driven accessories 150 (see FIGS. 4A-4B), such as the dual engine starter-generators 150a, 150b (see FIGS. 4A-4B). The planetary gear train 130 (see FIGS. 4A-4B, 5, 7A-7C) is a passive (analog) device that does not require active control with a two-speed transmission or other type of transmission for the combined HP/LP power extraction, as compared to known power extraction systems and methods.

In addition, disclosed embodiments of the power extraction system 10 (see FIGS. 4A-4B), such as in the form of the combined HP/LP spool power extraction system 11 (see FIGS. 4A-4B), and the method 200 (see FIG. 10) provide for increased power extraction, or power off-take, capabilities for gas turbine engines 20 (see FIGS. 1, 4A-4B, 5, 8), by extracting power 98 (see FIGS. 4A-4B) from both the LP spool 70 (see FIGS. 4A-4B) and the HP spool 80 (see FIGS. 4A-4B) simultaneously. Moreover, disclosed embodiments of the power extraction system 10 (see FIGS. 4A-4B), such as in the form of the combined HP/LP spool power extraction system 11 (see FIGS. 4A-4B), and the method 200 (see FIG. 10) provide a more efficient power extraction system 10 (see FIGS. 4A-4B), a more lightweight solution, and a less complex and simpler electric architecture for the extraction of power 98 (see FIGS. 4A-4B), such as electrical power 98b (see FIGS. 4A-4B), for vehicles 12 (see FIGS. 1, 4A-4B), such as aircraft, having an increased amount of electrical components requiring increased electrical power. Thus, the power extraction system 10 (see FIGS. 4A-4B) and method 200 (see FIG. 10) disclosed herein solve the problem of inadequate extraction of electrical power 98b (see FIGS. 4A-4B) for vehicles 12 (see FIGS. 1, 4A-4B), such as aircraft, that have an increased amount of electric components and that require an increased amount of electrical power.

Further, disclosed embodiments of the power extraction system 10 (see FIGS. 4A-4B), such as in the form of the combined HP/LP spool power extraction system 11 (see FIGS. 4A-4B), and the method 200 (see FIG. 10) provide for, in one embodiment, a clutch-brake mechanism 114 (see FIGS. 4A-4B, 5) that is used when the engine-driven accessories 150 (see FIGS. 4A-4B, 5) comprise one or more engine starter-generators (ESGs) 150a, 150b (see FIGS. 4A-4B, 5). The clutch-brake mechanism 114 (see FIGS. 4A-4B, 5) has an engine start mode 116 (see FIG. 4B) that disconnects the planetary gear train 130 (see FIG. 4B) from the LP spool 70 (see FIG. 4B) and brakes or grounds the ring gear 132 (see FIG. 4B) of the planetary gear train 130 (see FIG. 4B) to the mechanical structure 120 (see FIG. 4B); has a power extraction mode 124 (see FIG. 4B) that connects the LP spool 70 (see FIG. 4B) to the ring gear 132 (see FIG. 4B) of the planetary gear train 130 (see FIG. 4B); and has a spool-synchronization mode 122 (see FIG. 4B) that transitions from the engine start mode 116 (see FIG. 4B) to the power extraction mode 124 (see FIG. 4B).

During the power extraction mode 124 (see FIG. 4B), mechanical power 98a (see FIGS. 4A-4B, 5) is extracted from both the HP spool 80 (see FIGS. 4A-4B, 5) and the LP spool 70 (see FIGS. 4A-4B, 5), combined via the planetary gear train 130 (see FIGS. 4A-4B, 5), and subsequently supplied to the engine-driven accessories 150 (see FIGS. 4A-4B, 5), such as the engine starter-generators (ESGs) 150a, 150b (see FIGS. 4A-4B, 5) for the purpose of driving the ESGs 150a, 150b, to produce electrical power 98b (see FIGS. 4A-4B, 5) for the vehicle 12 (see FIGS. 1, 4A-4B, 5), such as an air vehicle 12a (see FIGS. 1, 4A-4B, 5), for example, an aircraft 46 (see FIG. 3). The clutch-brake mechanism 114 (see FIGS. 4A-4B, 5) is utilized to disconnect the LP spool 70 (see FIGS. 4A-4B, 5) and configure the planetary gear train 130 (see FIGS. 4A-4B, 5), such that the ESGs 150a, 150b can drive the HP spool 80 (see FIGS. 4A-4B, 5), in order to start the gas turbine engine 20 (see FIGS. 4A-4B, 5). Because the power extraction system 10 (see FIGS. 4A-4B), such as in the form of the combined HP/LP spool power extraction system 11 (see FIGS. 4A-4B), interconnects both of the ESGs 150a, 150b (see FIGS. 4A-4B, 5) to the HP spool 80 (see FIGS. 4A-4B, 5) and the LP spool 70 (see FIGS. 4A-4B), it allows for two ESGs 150a, 150b (see FIGS. 4A-4B, 5), instead of a total of three generators (two ESGs on the HP spool and one generator on the LP spool, of known power extraction systems) to produce the required electrical power 98b (see FIGS. 4A-4B, 5), yet still maintain a dual-redundancy for the function of the engine start mode 116 (see FIG. 4B). The combined HP/LP spool power extraction system 11 (see FIGS. 4A-4B, 5) design thus results in a lighter, more efficient power extraction, or power off-take, configuration, by having only two ESGs 150a, 150b (see FIGS. 4A-4B, 5) instead of three generators (two ESGs on the HP spool and one generator on the LP spool). Decreased weight to vehicles, such as aircraft and rotorcraft, may, in turn, result in decreased fuel costs.

In addition, disclosed embodiments of the power extraction system 10 (see FIGS. 4A-4B, 5), such as in the form of combined HP/LP spool power extraction system 11 (see FIGS. 4A-4B, 5), and method 200 (see FIG. 10), enable increased extraction of power 98 (see FIGS. 4A-4B, 5) with a decreased or smaller number of ESGs 150a, 150b (see FIGS. 4A-4B, 5) used, as compared to known power extraction systems and methods for gas turbine engines. In addition, the power extraction system 10 (see FIGS. 4A-4B, 5), such as in the form of the combined HP/LP spool power extraction system 11 (see FIGS. 4A-4B, 5), reduces the torque required from the one or more ESGs 150a, 150b (see FIGS. 4A-4B, 5), thus resulting in a torque reduction 128 (see FIG. 4B). The planetary gear train 130 (see FIGS. 4A-4B) provides a gear ratio advantage and reduces the torque required from the ESGs 150a, 150b (see FIGS. 1, 4A-4B) to the HP spool 80 (see FIGS. 4A-4B, 5), which means less current.

Moreover, disclosed embodiments of the power extraction system 10 (see FIGS. 4A-4B, 5), such as in the form of combined HP/LP spool power extraction system 11 (see FIGS. 4A-4B, 5), and method 200 (see FIG. 10), provide for the use of one or more inverter/converter/controllers (ICCs) 152a, 152b (see FIGS. 4A-4B, 5) with the embodiment having the clutch-brake mechanism 114 (see FIGS. 4A-4B, 5) and the ESGs 150a, 150b (see FIGS. 4A-4B, 5). The ICCs 152a, 152b (see FIGS. 4A-4B, 5) manage the operation of the ESGs 150a, 150b (see FIGS. 4A-4B, 5) and the clutch-brake mechanism 114 (see FIGS. 4A-4B, 5), and during the power extraction mode 124 (see FIG. 4B), the ICCs 152a, 152b filter and regulate the electrical power 98b (see FIGS. 4A-4B, 5) generated by the ESGs 150a, 150b and supply the electrical power 98b to one or more vehicle systems 160 (see FIGS. 4A-4B, 5), such as the electrical system 56 (see FIG. 3) of the vehicle 12 (see FIGS. 1, 4A-4B, 5), such as the aircraft 46 (see FIG. 3). During the engine start mode 116 (see FIG. 4B), the ICCs 152a, 152b control the states of the clutch-brake mechanism 114 (see FIGS. 4A-4B, 5) and the ESGs 150a, 150b (see FIGS. 4A-4B, 5) in the engine start mode 116 (see FIG. 4B).

Further, disclosed embodiments of the power extraction system 10 (see FIGS. 4A-4B), such as in the form of combined HP/LP spool power extraction system 11 (see FIGS. 4A-4B), and the method 200 (see FIG. 10) enable increased power extraction, or power off-take, with fewer engine starter-generators (ESGs) 150a, 150b (see FIGS. 4A-4B, 5) (e.g., one or two ESGs versus three ESGs) than known power extraction systems and methods. The power extraction system 10 (see FIGS. 4A-4B, 5), such as in the form of the combined HP/LP spool power extraction system 11 (see FIGS. 4A-4B, 5), enables faster transient power extraction with simpler electric architecture, and by using the inertia (spinning) of both the HP spool 80 (see FIGS. 4A-4B, 5) and the LP spool 70 (see FIGS. 4A-4B, 5) to the one or more ESGs 150a, 150b (see FIGS. 4A-4B, 5), no parallel connection of multiple generators extracting power individually from the LP shaft 74 and the HP shaft 84 is needed. This, in turn, avoids or minimizes any impact to the operability or the operating envelope of the gas turbine engine 20 (see FIGS. 1, 4A-4B, 5).

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A power extraction system for a gas turbine engine of a vehicle, the power extraction system comprising:

a high pressure (HP) spool tower shaft mechanically coupled between a high pressure (HP) spool of the gas turbine engine of the vehicle and an accessory gearbox assembly coupled to the gas turbine engine, the HP spool tower shaft extracting mechanical power from the HP spool; and a low pressure (LP) spool tower shaft mechanically coupled between a low pressure (LP) spool of the gas turbine engine of the vehicle and the accessory gearbox assembly, the LP spool tower shaft extracting mechanical power from the LP spool;

the accessory gearbox assembly comprising:

an accessory drive coupled to the HP spool tower shaft and coupled to the LP spool tower shaft, the accessory drive extracting the mechanical power from both the HP spool and the LP spool;

a planetary gear train coupled to the accessory drive, the planetary gear train mechanically combining the mechanical power from both the HP spool and the LP spool, and the planetary gear train driven by the mechanical power from both the HP spool and the LP spool;

a clutch-brake mechanism coupled between the accessory drive and a ring gear of the planetary gear train, the clutch-brake mechanism connecting and disconnecting the planetary gear train from the LP spool; and one or more engine-driven accessories coupled to the planetary gear train, the one or more engine-driven accessories driven by a planetary gear train output to generate power for use by one or more vehicle systems of the vehicle.

2. The power extraction system of claim 1 wherein the one or more engine-driven accessories comprise two engine starter-generators, to generate power comprising electrical power.

3. The power extraction system of claim 1 wherein the clutch-brake mechanism has an engine start mode that disconnects the planetary gear train from the LP spool and brakes the ring gear of the planetary gear train to a mechanical structure.

4. The power extraction system of claim 3 wherein the clutch-brake mechanism has a power extraction mode that connects the LP spool to the ring gear of the planetary gear train.

5. The power extraction system of claim 4 wherein the clutch-brake mechanism has a spool-synchronization mode that transitions from the engine start mode to the power extraction mode.

6. The power extraction system of claim 1 further comprising one or more controllers coupled to the one or more engine-driven accessories to control the one or more engine-driven accessories, and to regulate the power generated by the one or more engine-driven accessories and used by the one or more vehicle systems of the vehicle.

7. The power extraction system of claim 1 wherein the planetary gear train comprises the ring gear driven by mechanical power extracted from the LP spool, a carrier driven by mechanical power extracted from the HP spool, and a sun gear that generates the planetary gear train output to drive the one or more engine-driven accessories.

8. The power extraction system of claim 1 wherein the one or more engine-driven accessories comprise one or more of, an engine starter-generator, a hydraulic pump, a fuel pump, an oil pump, a generator, an air compressor, and a starter.

9. An air vehicle comprising:
a fuselage;
at least one wing connected to the fuselage;
at least one multi-spool gas turbine engine coupled to the at least one wing, the at least one multi-spool gas turbine engine having a high pressure (HP) spool and a low pressure (LP) spool; and
a combined HP/LP spool power extraction system coupled to the high pressure (HP) spool and to the low pressure (LP) spool of the at least one multi-spool gas turbine engine, the combined HP/LP spool power extraction system comprising:
a high pressure (HP) spool tower shaft mechanically coupled between the HP spool and an accessory gearbox assembly coupled to the at least one multi-spool gas turbine engine, the HP spool tower shaft extracting mechanical power from the HP spool; and
a low pressure (LP) spool tower shaft mechanically coupled between the LP spool and the accessory gearbox assembly, the LP spool tower shaft extracting mechanical power from the LP spool;
the accessory gearbox assembly comprising:
an accessory drive coupled to the HP spool tower shaft and coupled to the LP spool tower shaft, the accessory drive extracting the mechanical power from both the HP spool and the LP spool;

a planetary gear train coupled to the accessory drive, the planetary gear train mechanically combining the mechanical power from both the HP spool and the LP spool, and the planetary gear train comprising a ring gear driven by mechanical power extracted from the LP spool, a carrier driven by mechanical power extracted from the HP spool, and a sun gear that generates a planetary gear train output;
a clutch-brake mechanism coupled between the accessory drive and the ring gear of the planetary gear train, the clutch-brake mechanism connecting and disconnecting the planetary gear train from the LP spool; and
one or more engine-driven accessories coupled to the planetary gear train, the one or more engine-driven accessories driven by the planetary gear train output to generate power for use by one or more vehicle systems of the air vehicle.

10. The air vehicle of claim 9 wherein the one or more engine-driven accessories comprise two engine starter-generators, to generate power comprising electrical power.

11. The air vehicle of claim 9 wherein the clutch-brake mechanism has an engine start mode that disconnects the planetary gear train from the LP spool and brakes the ring gear of the planetary gear train to a mechanical structure, wherein the clutch-brake mechanism has a power extraction mode that connects the LP spool to the ring gear of the planetary gear train, and wherein the clutch-brake mechanism has a spool-synchronization mode that transitions from the engine start mode to the power extraction mode.

12. The air vehicle of claim 9 wherein the combined HP/LP spool power extraction system further comprises one or more controllers coupled to the one or more engine-driven accessories to control the one or more engine-driven accessories, and to regulate the power generated by the one or more engine-driven accessories and used by the one or more vehicle systems of the air vehicle.

13. The air vehicle of claim 9 wherein the one or more engine-driven accessories comprise one or more of, an engine starter-generator, a hydraulic pump, a fuel pump, an oil pump, a generator, an air compressor, and a starter.

14. A method of extracting mechanical power from both a high pressure (HP) spool and a low pressure (LP) spool of a gas turbine engine of a vehicle, to drive one or more engine-driven accessories, the method comprising the steps of:
coupling a combined HP/LP spool power extraction system to the high pressure (HP) spool and to the low pressure (LP) spool of the gas turbine engine of the vehicle, the combined HP/LP spool power extraction system comprising:
an accessory gearbox assembly comprising an accessory drive, a planetary gear train coupled to the accessory drive, a clutch-brake mechanism coupled between the accessory drive and a ring gear of the planetary gear train, the clutch-brake mechanism connecting and disconnecting the planetary gear train from the LP spool, and one or more engine-driven accessories coupled to the planetary gear train;
a high pressure (HP) spool tower shaft mechanically coupled between the HP spool and the accessory gearbox assembly; and
a low pressure (LP) spool tower shaft mechanically coupled between the LP spool and the accessory gearbox assembly;

extracting mechanical power from both the HP spool and the LP spool, via the accessory drive, to drive the planetary gear train;

mechanically combining, via the planetary gear train, the mechanical power extracted from both the HP spool and the LP spool, to obtain a planetary gear train output;

driving the one or more engine-driven accessories with the planetary gear train output; and generating power from the one or more engine-driven accessories and supplying the power to one or more vehicle systems of the vehicle.

15. The method of claim 14, wherein driving the one or more engine-driven accessories with the planetary gear train output further comprises, driving the one or more engine-driven accessories comprising two engine starter-generators, to generate power comprising electrical power.

16. The method of claim 14, further comprising using the clutch-brake mechanism in an engine start mode to disconnect the planetary gear train from the LP spool and to brake the ring gear of the planetary gear train to a mechanical structure; using the clutch-brake mechanism in a spool-synchronization mode to transition from the engine start mode to a power extraction mode; and using the clutch-brake mechanism in a power extraction mode to connect the LP spool to the ring gear of the planetary gear train.

17. The method of claim 14, further comprising coupling a controller to the one or more engine-driven accessories to control the one or more engine-driven accessories, and to regulate the power generated by the one or more engine-driven accessories and supplied to the one or more vehicle systems of the vehicle.

18. The method of claim 14, wherein extracting mechanical power from both the HP spool and the LP spool, via the accessory drive, to drive the planetary gear train, comprises extracting mechanical power from the HP spool to drive a carrier of the planetary gear train, and extracting mechanical power from the LP spool to drive the ring gear of the planetary gear train.

19. The method of claim 14, wherein driving the one or more engine-driven accessories with the planetary gear train output, comprises driving the one or more engine-driven accessories with the planetary gear train output comprising a sun gear output from a sun gear of the planetary gear train.

20. The method of claim 14, wherein driving the one or more engine-driven accessories with the planetary gear train output, comprises driving the one or more engine-driven accessories comprising one or more of, an engine starter-generator, a hydraulic pump, a fuel pump, an oil pump, a generator, an air compressor, and a starter.

* * * * *